(12) United States Patent
Okada

(10) Patent No.: US 8,661,856 B2
(45) Date of Patent: Mar. 4, 2014

(54) MANUFACTURING METHOD OF OPTICAL FIBER

(75) Inventor: Kenji Okada, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/161,132

(22) Filed: Jun. 15, 2011

(65) Prior Publication Data

US 2011/0239709 A1 Oct. 6, 2011

Related U.S. Application Data

(63) Continuation of application No. PCT/JP2009/007073, filed on Dec. 21, 2009.

(30) Foreign Application Priority Data

Dec. 19, 2008 (JP) .................................. 2008-324366

(51) Int. Cl.
   *C03B 37/025* (2006.01)
(52) U.S. Cl.
   USPC .................. 65/381; 65/382; 65/432; 65/477; 65/486; 65/491; 65/510; 65/513; 65/435
(58) Field of Classification Search
   None
   See application file for complete search history.

(56) References Cited

U.S. PATENT DOCUMENTS

| | | | |
|---|---|---|---|
| 4,792,347 A | 12/1988 | Deneka et al. | |
| 5,974,837 A | 11/1999 | Abbott, III et al. | |
| 6,131,415 A | 10/2000 | Chang et al. | |
| 8,015,847 B2 | 9/2011 | Okada et al. | |
| 2003/0148025 A1 | 8/2003 | Azegami et al. | |
| 2005/0252246 A1 | 11/2005 | Shirley et al. | |
| 2008/0016917 A1* | 1/2008 | Miyamoto et al. | ............. 65/488 |

FOREIGN PATENT DOCUMENTS

| | | | |
|---|---|---|---|
| CN | 1157807 A | | 8/1997 |
| CN | 1405105 A | | 3/2003 |
| CN | 1882513 A | | 12/2006 |
| DE | 3925946 A | * | 2/1991 |
| JP | 63-100036 A | | 5/1988 |
| JP | 1-183434 A | | 7/1989 |
| JP | 01286941 A | * | 11/1989 |
| JP | 7-109150 A | | 4/1995 |

(Continued)

OTHER PUBLICATIONS

EPO Machine Translation of DE3925946.*

(Continued)

*Primary Examiner* — Christina Johnson
*Assistant Examiner* — Lisa Herring
(74) *Attorney, Agent, or Firm* — Sughrue Mion, PLLC

(57) ABSTRACT

In an optical fiber manufacturing method, the cooling device and the coating device are connected in an airtight manner and by preventing a cooling gas, flowing inside the cooling device, from flowing into the coating device by a meniscus of resin inside of the coating device, a flow of the cooling gas inside the cooling device is discharged to an outside of an upper end of the cooling device as an upward stream; helium gas as the cooling gas flows into a lower portion of the cooling device and carbon dioxide gas as the cooling gas which is separated from the helium gas flows into a side lower than a position where the helium gas flows in, during the forcible cooling; and a flow rate of the helium gas and a flow rate of the carbon dioxide gas are individually controlled.

7 Claims, 10 Drawing Sheets

(56) References Cited

FOREIGN PATENT DOCUMENTS

| | | | |
|---|---|---|---|
| JP | 8-259273 | A | 10/1996 |
| JP | 2844741 | B2 | 1/1999 |
| JP | 2000103649 | A * | 4/2000 |
| JP | 3098232 | B1 | 10/2000 |
| JP | 2003-95689 | A | 4/2003 |
| JP | 2003-226559 | A | 8/2003 |
| JP | 2004-339026 | A | 12/2004 |
| JP | 2004-359513 | A | 12/2004 |
| JP | 2005-075664 | A | 3/2005 |
| JP | 2007-197273 | A | 8/2007 |
| JP | 4214389 | B2 | 1/2009 |
| RU | 2177916 | C2 | 6/1998 |
| RU | 2169710 | C2 | 11/1999 |
| RU | 2174248 | C2 | 4/2000 |
| RU | 2329123 | C2 | 4/2005 |

OTHER PUBLICATIONS

JPO Machine Translation of JP2003-095689.*
EPO Machine Translation of DE3925946, performed on EPO website Feb. 6, 2012.*
JPO Machine Translation of JP2003-095689, performed on JPO web site Feb. 6, 2012.*
JPO Machine Translation of JP2001-013380, performed on JPO web site Jun. 5, 2012.*
Decision on Grant mailed Sep. 3, 2012, in corresponding Russian Patent Application No. 2011124508/03.
International Search Report dated May 25, 2010, issued in International Patent Application No. PCT/JP2010/002761.
Office Action mailed Jun. 5, 2013, issued in corresponding Chinese Patent Application No. 200980150373.4.

* cited by examiner

MANUFACTURING METHOD OF OPTICAL FIBER

CROSS-REFERENCE TO RELATED APPLICATION

This is a Continuation Application of International Application No. PCT/JP2009/007073, filed on Dec. 21, 2009, which claims priority to Japanese Patent Application No. 2008-324366 filed on Dec. 19, 2008. The contents of the aforementioned applications are incorporated herein by reference.

BACKGROUND OF THE INVENTION

1. Field of the Invention

The present invention relates to a method of manufacturing an optical fiber in which an optical fiber is manufactured by drawing a bare optical fiber from an optical fiber preform in an optical fiber manufacturing process.

2. Description of the Related Art

FIG. 14 is a schematic configuration diagram illustrating an optical fiber manufacturing apparatus used in manufacturing a general silica optical fiber. Manufacturing of an optical fiber in the conventional technique is performed through the following processes using the optical fiber manufacturing apparatus shown in FIG. 14.

(I) An optical fiber preform 101 made from a glass rod which is formed of material of an optical fiber is introduced into a heating furnace 102. Then, a leading edge of the optical fiber preform 101 is heated and melted at a temperature of approximately 2000° C. by a heater 102a, and the melted portion is drawn downward from the heating furnace 102 as a bare optical fiber 103.

(II) Next, the drawn bare optical fiber 103 is cooled. A cooling device 104 including a vertically long cooling tube is installed under the heating furnace 102. A cooling gas (helium gas (He) or the like) is supplied to the inside of the cooling tube from a side portion of the cooling tube. The cooling gas flows upward and downward inside the cooling tube. Arrow indications in the cooling device 104 in FIG. 14 indicate the flow 110 of the cooling gas. The bare optical fiber 103 drawn out of the heating furnace 102 is sufficiently cooled down to the temperature at which the bare optical fiber 103 can be coated by the coating resin.

(III) Next, a coating resin is coated on the cooled bare optical fiber 103 by a coating device 106 in order to protect the surface of the bare optical fiber 103. The coating resin is thermally cured by a curing device 108 or is ultraviolet-cured. Thus, the bare optical fiber 103 becomes an optical fiber 107. This coating resin is generally configured as a bi-layer structure, in which a material having a low Young's modulus is coated on the inner side and a material having a high Young's modulus is coated on the outer side.

(IV) Next, the optical fiber 107 is rolled up. The coated optical fiber 107 is rolled up by a winding device (not shown) through a turn pulley 109.

In the optical fiber manufacturing method, it is desirable to enhance the productivity of the optical fiber, to increase the size of the optical fiber preform, and to increase the fiber drawing velocity (hereinafter, referred to as "drawing velocity").

In general, according to an acceleration in drawing velocity the amount of fluctuation of the drawing velocity (fluctuation of the range of center drawing velocity±X (m/min)) (hereinafter, referred to as "drawing velocity fluctuation range") increases. For this reason, it is necessary to reliably perform protection coating (resin coating) with a constant coating diameter, in a large drawing velocity fluctuation range.

In a case where the drawing velocity is slow, for example, in a case where the drawing velocity fluctuation range is ±30 (m/min) at a drawing velocity of 300 (m/min), in this drawing velocity and drawing velocity fluctuation range, it is possible to reliably coat the bare optical fiber with a constant coating diameter with the coating resin, without using a particularly complicated process.

On the other hand, in a case where the drawing velocity is high as described above, for example, in a case where the drawing velocity is 2000 (m/min), if the drawing velocity fluctuation range is 10% (±200 (m/min)) of the drawing velocity in a similar way to the case where the drawing velocity is slow, the drawing velocity range becomes 2000 (m/min)±200 (m/min). Thus, it is necessary to reliably coat the bare optical fiber with a constant coating diameter with the coating resin in this drawing velocity range. However, in a case where the optical fiber manufactured at the same drawing velocity as in the case where the drawing velocity is slow, that is, in the drawing velocity range of 2000 (m/min)±30 (m/min) is used as a good quality portion, if the optical fiber is manufactured in the drawing velocity range of 2000 (m/min)±200 (m/min), faulty portions in the optical fiber significantly increase, and the yield ratio is decreased.

Further, as the drawing velocity increases, the length of the optical fiber required for a speed increase or speed stabilization increases until the drawing velocity reaches a high speed state (for example, about 2000 (m/min) or higher) which is the final drawing velocity from a slow speed state (for example, about 30 (m/min) or lower or higher) when the fiber drawing is started. As a result, the number of faulty portions increases in the manufactured optical fiber, and the yield ratio is decreased.

Further, if the fiber drawing is ended in a state where the drawing velocity is high, the coating device may be damaged by the terminal of the cut optical fiber. In addition, when the terminal of the optical fiber reaches an optical fiber winding bobbin, the terminal of the optical fiber strikes the good quality optical fiber, thereby damaging it.

For this reason, in the optical fiber manufacturing method, it is necessary to maintain the drawing velocity as slow as possible when the fiber drawing from the optical fiber preform starts, to maintain the manufactured optical fiber in a good quality state, and to reach the final drawing velocity in the good quality state. Further, in a terminal end of the optical fiber preform, it is necessary to stop the fiber drawing from the optical fiber preform after the drawing velocity is slowly decreased in this good quality state. Furthermore, in this optical fiber manufacturing method, it is necessary to maintain a constant coating diameter.

As factors causing a change in the coating diameter, a change in temperature of the bare optical fiber when the coating resin is coated, a change in the shear velocity of the coating material in die lands inside the coating device, and the like are generally exemplary examples.

The temperature change in the bare optical fiber during coating is represented as change in the cooling capacity of the cooling device when the bare optical fiber drawn out of the optical fiber preform is sufficiently cooled down to the temperature at which the bare optical fiber can be coated by the coating resin, in the drawing velocity range. This change in the cooling capacity significantly affects the change in the coating diameter. It is desirable to appropriately adjust the temperature of the bare optical fiber in a wide drawing velocity range.

The change in the shear velocity of the coating material in the die lands inside the coating device mainly depends on a viscosity change due to the change in the temperature of the coating material or a change in a coating material supply pressure into the coating device. However, the drawing velocity range insignificantly affects these changes, which may be considered as almost no effect.

Thus, an optical fiber manufacturing method is disclosed as described below.

There is disclosed a technique in which the total flow rate of two types of gases flowing into a cooling device is maintained at a constant value, the ratio of the flow rates of these gases is fed back to all of the gas lines according to the drawing velocity, and the temperature of the bare optical fiber or the coating diameter is maintained at a constant value (refer to Patent Document 1, for example). In this technique, the ratio of the gas flow rates is changed according to a signal indicating the temperature of the optical fiber or a signal indicating the coating diameter, instead of the drawing velocity. That is, this technique is a technique in which the feedback is basically applied to all of the gas lines from one signal line to maintain the coating diameter at a constant value.

In the technique disclosed in Patent Document 1, the gas flow rate of a specific amount or more is required to prevent mixture with outside air. Further, the mixture ratio of two or more types of gases which are used is changed while maintaining the total amount of the gas flow rates at a constant value in order to maintain the temperature of the bare optical fiber at a constant value with respect to a change in the drawing velocity (or the temperature of the bare optical fiber or the coating diameter).

In this way, in order to prevent the mixture of outside air, the gas flow rate of the specific amount or more is required. For this reason, if this technique is applied to a case where the optical fiber is adapted to a wide drawing velocity range or a case where the fiber drawing velocity is increased, the amount of used gas is significantly increased. Thus, the Reynolds number inside the cooling device is increased, and as a result, the flow of the gas becomes turbulent. Thus, the bare optical fiber inside the cooling device vibrates (fiber vibration), and thus, the coating becomes unstable. Further, in a case where fiber vibration is large, the bare optical fiber comes in contact with an inner wall of the cooling device to thereby damage the bare optical fiber, and thus, the strength of the manufactured optical fiber is lower, and thereby leads to breakage.

On the other hand, if the amount of the used gas is reduced, outside air is mixed into the cooling device making the cooling capacity unstable. As a result, the temperature of the bare optical fiber becomes unstable. For this reason, a large amount of gas is required, and thus, the usage amount of expensive helium gas increases, thereby increasing the manufacturing cost of the optical fiber.

Further, if the total amount of gas flow rates is controlled to be constant, other types of gas flow rates should be increased as one type of gas is reduced. In this case, it is difficult to obtain the total amount of gas flow rates at which the temperature of the bare optical fiber is maintained at a constant value.

Further, in a case where it is undesirable to set the flow rate of one type of gas to zero due to problems other than cooling (for example, prevention of the mixing of air bubbles into the coating resin, or the like) in order to maintain the temperature of the bare optical fiber at a constant value, an applicable drawing velocity range becomes narrow.

Further, it is difficult to change the density ratio of gases in the longitudinal direction inside the cooling device since the plurality of gases is mixed and then introduced into the cooling device, and to minutely adjust the cooling capacity. Thus, it is difficult to apply the technique to a wide drawing velocity range.

There is disclosed a technique in which two or more types of gases are introduced into a cooling device, in which these gases are divided into a gas having a fixed flow rate and a gas having a variable flow rate, feedback is applied using a signal indicating the coating diameter of an optical fiber, the flow rate of the gas having the variable flow rate is changed, and thus, the coating diameter is maintained at a constant value (refer to Patent Document 2, for example). This technique is a technique in which the feedback is applied by one signal line to maintain a constant coating diameter at a constant value.

In this technique, a specific amount of gas flow rate is required in order to prevent the mixture of outside air. Further, in a case where fiber drawing is performed at a high speed of 2000 (m/min) or higher, it is necessary to increase the flow rate of the gas having the fixed flow rate. For this reason, the bare optical fiber inside the cooling device is vibrated, thereby making the coating unstable. Further, in a case where the fiber vibration is large, the bare optical fiber comes in contact with an inner wall of the cooling device to thereby damage the bare optical fiber, and thus, the strength of the manufactured optical fiber is lower, and thereby leads to breakage.

Further, if the amount of the used gas is reduced, outside air is mixed into the cooling device, and thus, the cooling capacity becomes unstable. As a result, the temperature of the bare optical fiber becomes unstable. For this reason, a large amount of gas is required, and thus, the usage amount of expensive helium gas is increased, thereby increasing the manufacturing cost of the optical fiber.

Further, since a cooling gas having a high thermal conductivity is required to have the fixed flow rate, it is necessary to increase the flow rate of gas having a low thermal conductivity, in order to maintain the coating diameter of the optical fiber at a constant value in a wider drawing velocity range, in particular, in order to correspond to the case of a slow drawing velocity. For this reason, the bare optical fiber inside the cooling device is vibrated, thereby making the coating unstable. Further, in a case where fiber vibration is large, the bare optical fiber comes in contact with an inner wall of the cooling device to thereby damage the bare optical fiber, and thus, the strength of the manufactured optical fiber is lower, and thereby leading to breakage. Further, since helium gas having a fixed flow rate is present, even though the flow rate of gas having a lower thermal conductivity, as the gas having the variable flow rate, is increased, in a case where the drawing velocity is slow, the temperature of the bare optical fiber is decreased, thereby making it difficult to maintain the coating diameter at a constant value.

In the states of the slow drawing velocity and the high drawing velocity, as the drawing velocity becomes high, the flow rate of the gas having the low thermal conductivity has decreased and the flow rate of the gas having the high thermal conductivity has increased, inside the cooling device. As a result, when the flow rate of the gas having the low thermal conductivity inside the cooling device becomes zero, the cooling capacity of the cooling device is maximized. Thus, the gas flow rate is adjusted at the time of the state where the drawing velocity is slow, and thereafter, in a case where the drawing velocity is higher than or equal to the drawing velocity at the time when the flow rate of the gas having the low thermal conductivity becomes zero, the cooling device cannot sufficiently cool the bare optical fiber. As a result, there may be a case where the coating diameter of the coating resin is minutely changed, or in the worst case, the liquid coating material may be vaporized by the heat of the bare optical fiber, thereby causing coating errors.

In the techniques disclosed in Patent Document 1 and Patent Document 2, locations where the cooling device is in contact with outside air are present above and below. For this reason, if the gas flow rate or gas temperature of the cooling device and the fiber drawing velocity are changed, the gas flow may become unstable (upward stream and downward stream). That is, since the gas flow is changed in the slow drawing velocity range and the high drawing velocity range, the cooling capacity is significantly changed at the time of the gas flow change. Thus, in a wide drawing velocity range, it is difficult to maintain a constant cooling capacity of the cooling device at a constant value, and to maintain a constant temperature of the bare optical fiber or the coating diameter of the coating resin at a constant value.

PATENT DOCUMENTS

[Patent Document 1] Japanese Patent No. 2844741
[Patent Document 2] Japanese Patent No. 3098232

An object of the present invention is that it provides an optical fiber manufacturing method which can reduce the amount of a used cooling gas, can adjust the cooling capacity of a cooling device with high responsiveness when an optical fiber is manufactured by a fiber drawing from an optical fiber preform, and can suppress change in the coating diameter of a coating resin.

SUMMARY

The present invention employs the following means to solve the above technical problem.

(1) An optical fiber manufacturing method according to the present invention includes: melting and deforming an optical fiber preform; drawing a melted and deformed portion from the optical fiber preform as a bare optical fiber; forcibly cooling the bare optical fiber in a cooling device; forming a protective cover layer on the cooled bare optical fiber in a coating device; and curing the protective cover layer. The method further includes: connecting the cooling device and the coating device in an airtight manner and by preventing a cooling gas, flowing inside the cooling device, from flowing into the coating device by a meniscus of resin inside of the coating device, discharging a flow of the cooling gas inside the cooling device to an outside of an upper end of the cooling device as an upward stream; allowing helium gas as the cooling gas to flow into a lower portion of the cooling device and allowing carbon dioxide gas as the cooling gas which is separated from the helium gas to flow into a side lower than a position where the helium gas flows in, during the forcible cooling; and individually controlling a flow rate of the helium gas and a flow rate of the carbon dioxide gas.

(2) The method may further include: controlling the flow rate of the helium gas using a signal indicating a drawing velocity of the optical fiber; and feedback controlling the flow rate of the carbon dioxide gas using a signal indicating a coating diameter of the optical fiber.

(3) The method may further include: controlling the flow rate of the carbon dioxide gas using a signal indicating a drawing velocity of the optical fiber; and feedback controlling the flow rate of the helium gas using a signal indicating a coating diameter of the optical fiber.

(4) In a case where the flow rate of the helium gas at the maximum drawing velocity $V_{max}$ (m/min) of the optical fiber is $X_1$ (Standard Liters per Minute; SLM), the flow rate of the helium gas at a normal fiber drawing velocity $V_{center}$ (m/min) of the optical fiber is $X_2$ (SLM), the flow rate of the helium gas at the minimum drawing velocity $V_{min}$ (m/min) of the optical fiber is $X_3$ (SLM), the drawing velocity of the optical fiber is $V$ (m/min), and the flow rate of the helium gas is $X$ (SLM), $V_{max}$, $V_{center}$, $V_{min}$, $V$, $X_1$, $X_2$, $X_3$ and $X$ satisfy following formulas (1) or (2):

[Formula 1]

$$X = \frac{X_1 - X_2}{V_{max} - V_{center}} V + \frac{V_{max} X_2 - V_{center} X_1}{V_{max} - V_{center}} \quad (V_{center} \leq V \leq V_{max}) \quad (1)$$

$$X = \frac{X_2 - X_3}{V_{center} - V_{min}} V + \frac{V_{center} X_3 - V_{min} X_2}{V_{center} - V_{min}} \quad (V_{min} \leq V \leq V_{center}) \quad (2)$$

(5) The method may further include: allowing helium gas, carbon dioxide gas or nitrogen gas to flow into an upper portion of the cooling device; and individually controlling the flow rate of each gas.

(6) In a case where change in the drawing velocity $V$ of the optical fiber is set to $V_{min2} < V_{min} < V_{center} < V_{max} < V_{max2}$, the carbon dioxide gas or the nitrogen gas flowed into the upper portion of the cooling device may be independently feedback-controlled using a signal indicating a coating diameter of the optical fiber in the range of $V_{min2} < V < V_{min}$, and the helium gas flowed into the upper portion of the cooling device may be independently controlled using a signal indicating the drawing velocity of the optical fiber in the range of $V_{max} < V < V_{max2}$.

According to the optical fiber manufacturing method disclosed in the above (1), since the cooling device and the coating device are connected and a gas discharge port is located only in the upper portion of the cooling device, it is possible to efficiently prevent outside gas from being introduced into the cooling device, and to increase the density of the helium gas inside the cooling device. As a result, it is possible to significantly reduce the flow rate of helium to approximately 5 to 50% of the conventional technique. Further, since the outside gas can be efficiently prevented from being introduced into the cooling device, it is possible to maintain the gas flow inside the cooling device as a stable upward stream.

Further, as the carbon dioxide gas flows in the upper portion of the coating device and the helium gas flows in the lower portion of the cooling device, the upward stream is generated inside the cooling device, and the carbon dioxide gas is sufficiently present near the coating resin. Thus, it is possible to prevent bubbles from being mixed into the protective cover layer.

Further, since only the helium gas and the carbon dioxide gas are used, it is possible to maintain, by adjusting the flow rates of these gases, the responsiveness of the cooling capacity of the cooling device according to change in the flow rates, at a high level in a drawing velocity range in which the optical fiber is stably manufactured as a good quality portion.

In the cases of the above (2) and (3), since the flow rate of the helium gas is controlled by the drawing velocity signal and the flow rate of the carbon dioxide gas is feedback controlled by the coating diameter signal, the control of each gas flow rate can be performed by the independent signal. Accordingly, it is possible to widen the drawing velocity range in which the coating diameter can be maintained at a constant value, and to maintain the adjustment responsiveness of the cooling capacity at a high level. This is similarly applied to a case where the flow rate of the carbon dioxide gas is controlled by the drawing velocity signal and the flow rate of the helium gas is feedback controlled by the coating diameter signal.

Thus, as the drawing velocity range in which the coating diameter can be maintained at a constant value is widened, it is possible to decrease the drawing velocity when the fiber drawing is started, to increase the drawing velocity before a normal drawing velocity for fiber drawing a long good quality portion, and then to decrease the drawing velocity on a terminal end side of the fiber drawing, while maintaining the manufactured optical fiber as a good quality portion. Thus, it is possible to enhance the yield ratio, and to prevent damage of the coating device or damage which may occur as the terminal of the optical fiber strikes the rolled optical fiber of a good quality.

Further, since the responsiveness of the cooling capacity is high as described above, it is possible to maintain the coating diameter of the protective cover layer at a constant value. That is, lateral pressure properties of the manufactured optical fiber become desirable.

Further, since the flow rate of the helium gas can be significantly reduced, it is possible to reduce the manufacturing cost of the optical fiber, thereby making it possible to manufacture the optical fiber at a low cost.

Further, since the total amount of the gas flow rates inside the cooling device can be decreased, it is possible to manufacture the optical fiber of a good quality in a wide drawing velocity, without causing fiber vibration.

EMBODIMENTS FOR CARRYING OUT THE INVENTION

Embodiments of an optical fiber manufacturing method according to the present invention will be described.

These embodiments are specifically described for easy understanding of the aspects and features of the present invention, and do not limit the scope of the present invention unless particularly mentioned.

(1) First Embodiment

Figure 1:
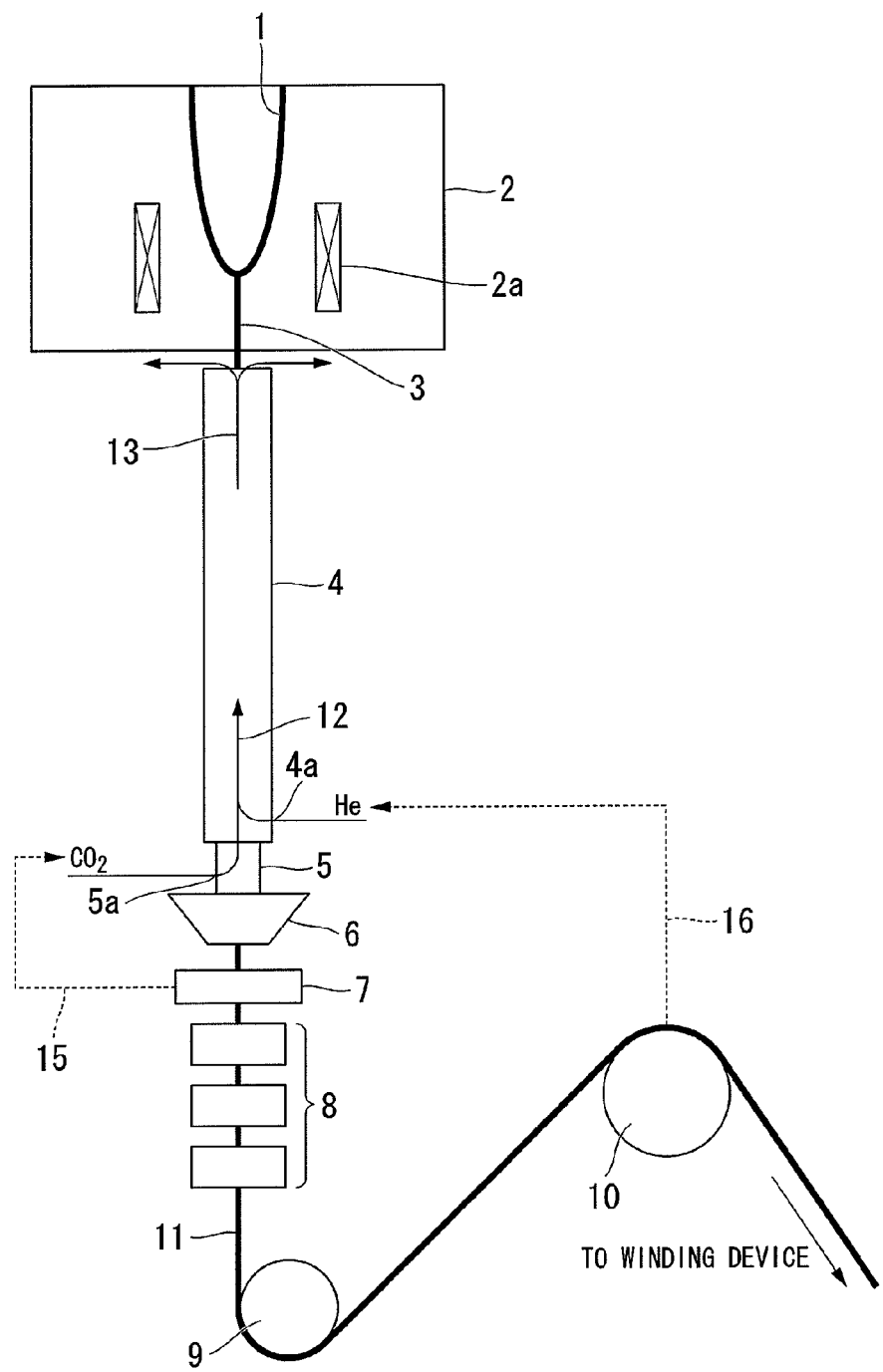
FIG. 1 is a schematic configuration diagram illustrating an optical fiber manufacturing apparatus used in an optical fiber manufacturing method according to a first embodiment of the present invention.

FIG. 1 is a schematic configuration diagram illustrating an optical fiber manufacturing method in an optical fiber manufacturing method according to a first embodiment of the present invention.

The optical fiber manufacturing apparatus includes a heating furnace 2, a cooling device 4, a coating device 6, a cylindrical connection component 5 which connects the cooling device 4 and the coating device 6, an outer diameter measuring device 7, a curing device 8, a turn pulley 9 and a drawing capstan 10.

The connection component 5 is installed between the cooling device 4 and the coating device 6, and the connection component 5 connects the cooling device 4 and the coating device 6 in an airtight manner.

On a lower side surface of the cooling device 4, an introduction port 4a of helium gas is formed. On a side surface of the connection component 5, an introduction port 5a of carbon dioxide gas is formed.

Figure 2:
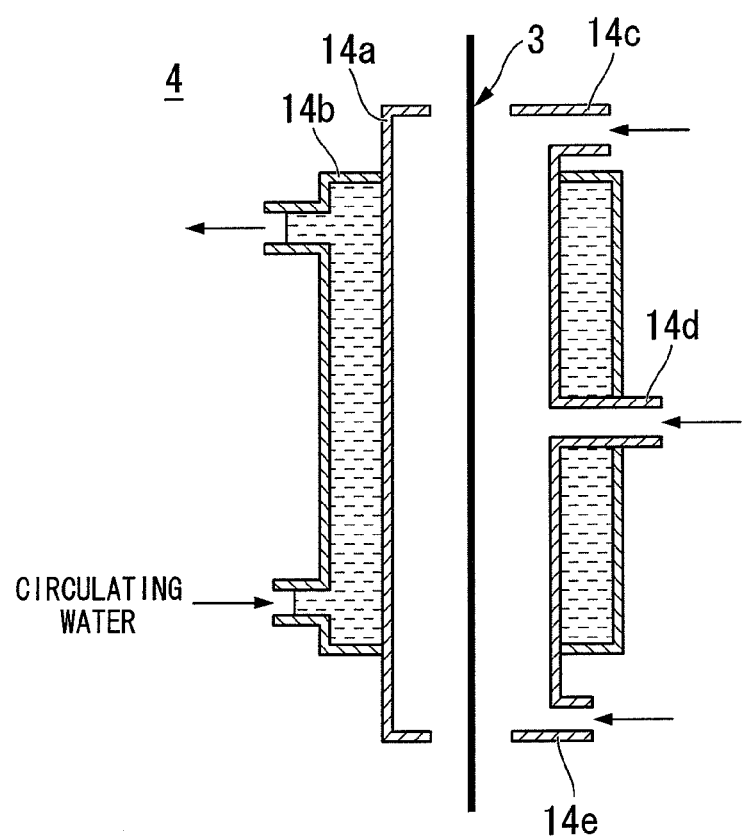
FIG. 2 is a schematic cross-sectional diagram illustrating a typical cooling device.

As the cooling device 4, for example, a configuration as shown in FIG. 2 is used.

This cooling device 4 includes a cooling tube 14a and a circulating water tube 14b.

A bare optical fiber 3 is inserted into the cooling tube 14a.

From any one of an introduction port 14c installed in an upper portion of the cooling tube 14a, an introduction port 14d installed in the center of the cooling tube 14a, and an introduction port 14e installed in a lower portion of the cooling tube 14a, cooling gas (hereinafter, may be simply referred to as gas) is introduced in the cooling tube 14a. For example, in the cooling device 4 shown in FIG. 1, the introduction port 14e of the cooling tube 14a is the introduction port 4a of the helium gas, and the other introduction ports 14c and 14d of the cooling tube 14a are closed so that flow of the gas in and out is not allowed.

In the circulating water tube 14b, cooling water is introduced and circulated.

The bare optical fiber 3 is cooled by heat exchange between the cooling gas and the circulating water passing through the cooling tube 14a, and is sent to the coating device 6 which coats resin which becomes a cover layer through the connection component 5.

In this embodiment, the plurality of cooling devices 4 is connected. In such a case where the plurality of cooling devices 4 is connected, only the introduction port 14e of the lowest cooling tube 14a becomes the introduction port 4a of the helium gas, and the other introduction ports are closed.

The outer diameter measuring device 7 is connected with a first controller through a cable 15 (not shown). The first controller controls the flow rate of carbon dioxide gas flowing into the cooling device 4 from an introduction port 5a of the connection component 5.

The drawing capstan 10 is connected with a second controller through a cable 16 (not shown). The second controller controls the flow rate of helium gas flowing into the cooling device 4 from the introduction port 4a of the cooling device 4. The drawing velocity of the optical fiber 11 is calculated by the rotation velocity of the drawing capstan 10.

The optical fiber manufacturing method which uses the optical fiber manufacturing apparatus will be described.

An optical fiber preform 1 is melted and deformed in the heating furnace 2, and a portion of the melted and deformed optical fiber preform 1 is pulled out from an outlet port of the heating furnace 2 as the bare optical fiber 3.

Then, the bare optical fiber 3 is forcibly cooled by the cooling device 4 which is installed under the heating furnace 2 and is not connected with the heating furnace 2.

Thereafter, the cooled bare optical fiber 3 is formed with a protective cover layer thereon by the coating device 6 which is installed under the cooling device 4, and becomes an optical fiber 11.

The coating diameter (outer diameter of the optical fiber 11) of the optical fiber 11 on which the protective cover layer is coated is measured by the outer diameter measuring device 7.

Then, the protective cover layer of the optical fiber 11 is cured by the curing device 8.

The optical fiber 11 is rolled up to a winding device (not shown) through the turn pulley 9 and the drawing capstan 10.

In the optical fiber manufacturing method according to this embodiment, cooling gas (helium or carbon dioxide gas) flows into a space (here, in an upper end section of the cooling device 4, the space is opened outwardly) enclosed by the cooling device 4, the connection component 5, the coating device 6, and a meniscus of coated resin inside of the coating device 6. Thus, the flow of the gas inside the cooling device 4 and the connection component 5 forcibly becomes an upward stream except for a part of gas flowing along the bare optical fiber 3, and is discharged outside of the cooling device 4 only from the upper end section of the cooling device 4.

Due to the flow of the cooling gas, the flow of the gas in the cooling device 4 does not become unstable, and the flow of the unstable gas depending on fiber drawing conditions of the optical fiber 11 is not generated. Thus, the flow of the cooling gas becomes the stable upward streams 12 and 13. As a result, the cooling device 4 obtains a stable cooling capacity.

Further, the gas which becomes the upward streams 12 and 13 is forcibly ejected outside from the upper end of the cooling device 4 which can be an entry port into the cooling device 4 of external gas. Thus, mixture of the gas into the cooling device 4 from the outside of the cooling device 4 can be minimized. Accordingly, the density of the cooling gas in the cooling device 4 can be maximally increased. In particular, in a case where the helium gas is used, the amount of helium gas used may be significantly reduced. Thus, it is possible to reduce the manufacturing cost of the optical fiber.

In this embodiment, the carbon dioxide gas separated from the helium gas flows in the cooling device 4, in addition to the helium gas.

A place where the helium gas flows in is a lower portion of the cooling device 4 or an upper portion of the connection component 5. On the other hand, a place where the carbon dioxide gas flows in is a downside of the place where the helium gas flows in, which is an upper portion of the coating device 6 or a lower portion of the connection component 5. According to the location relationship between them, the place where the helium gas flows in is the downstream side with respect to the flow of the upstream gas, and the place where the carbon dioxide gas flows in is the upstream side with respect to the flow of the upstream gas.

Thus, the flows of the gas become the upward streams 12 and 13, and each gas flows stably. Thus, the density of the carbon dioxide gas becomes highest around the coating device 6, and mixture or residue of bubbles into the protective cover layer can be prevented.

Further, since the mixture state of the helium gas and the carbon dioxide gas flowing into the upper portion (downstream) of the cooling device 4 is constantly stable, the cooling capacity due to these gases becomes stable without being unstable according to the drawing velocity. Thus, it is possible to provide a good responsiveness when adjusting the cooling capacity of the cooling device 4 by changing the flow rate of the gases according to the drawing velocity, and to coat the bare optical fiber 3 with a uniform coating diameter.

Further, the flow rates of the helium gas flowing into the lower portion of the cooling device 4 or the upper portion of the connection component 5, and the carbon dioxide gas flowing into the upper portion of the coating device 6 or the lower portion of the connection component 5 are individually adjusted, and thus, the cooling efficiency (cooling capacity) of the cooling device 4 can be adjusted. That is, in this embodiment, the flow rate of the helium gas and the flow rate of the carbon dioxide gas are controlled by two types of independent signals. As the two types of independent signals, a drawing velocity signal indicating the drawing velocity of the optical fiber 11 and a coating diameter signal indicating the coating diameter of the optical fiber 11 are used.

It is preferable that the flow rate of the helium gas having a high thermal conductivity is controlled by the drawing velocity signal of the optical fiber, and the flow rate of the carbon dioxide gas having a low thermal conductivity is feedback controlled (PID control) by the coating diameter signal. Further, the type of the gas controlled by the coating diameter may be switched according to the drawing velocity.

Further, with respect to a mixture gas in a mixture gas region of the carbon dioxide gas and the helium gas which exist between the introduction port 5a of the carbon dioxide gas and the introduction port 4a of the helium gas (a region where the carbon dioxide gas which becomes the upward stream is mixed with the helium gas which is pulled out along the bare optical fiber 3), this mixture gas becomes an upward stream due to the upward stream generated from the upstream side (the side of the coating device 6). Thus, this mixture gas constantly flows toward the upper side (the side of the heating furnace 2) of the cooling device 4, and is finally discharged from the upper end of the cooling device 4. For this reason, in the optical fiber manufacturing method according to this embodiment, the adjustment of the cooling capacity can be easily performed with a high responsiveness.

Thus, in the optical fiber manufacturing method according to this embodiment, even though the drawing velocity at which the fiber drawing is performed is changed from slow speed to high speed, the control of the cooling capacity of the cooling device 4 which makes the coating diameter constant in its range can be performed according to the fluctuation of the drawing velocity with a high responsiveness.

In the cooling device 4 according to this embodiment, when the flow rates of the gases flowing into the cooling device 4 are changed according to the drawing velocity, increase and decrease directions of the gases become opposite. That is, in a case where the drawing velocity is slow, the flow rate of the helium gas decreases, and the flow rate of the carbon dioxide gas increases. This means that the increased amount of the carbon dioxide gas is small, compared with a case where the flow rate of the helium gas having a high thermal conductivity is fixed. On the other hand, in a case where the drawing velocity is high, the flow rate of the helium gas increases and the flow rate of the carbon dioxide gas decreases. In this way, in this embodiment, the total amount of the gas flow rates in the cooling device 4 is changed. However, since entry of the gas from the outside is low, and the increase and decrease directions of the gases are opposite, the total amount of the gas flow rates does not significantly increase. Thus, fiber vibration of the bare optical fiber 3 does not occur.

Further, in the optical fiber manufacturing method according to this embodiment, the flow rate of the helium gas having a high thermal conductivity is controlled according to the drawing velocity signal. Thus, in a case where the drawing velocity is slow, the flow rate of the helium gas is especially small, and may decrease down to 0 as necessary. On the other hand, in a case where the drawing velocity is high, the flow rate of the helium gas may increase up to an appropriate flow rate capable of cooling the bare optical fiber 3. Here, in a state where the appropriate cooling length of the cooling device 4 is secured, the flow rate of each gas is adjusted to perform minute adjustment of the cooling capacity, and thus, the gas flow rates does not significantly increase (for example, 10 (L/min) or higher). Thus, the gas flow rates do not reach a level at which fiber vibration of the bare optical fiber 3 is caused.

Further, in the optical fiber manufacturing method according to this embodiment, the flow rate of the carbon dioxide gas having a low thermal conductivity is feedback controlled according to the coating diameter signal. Thus, when the coating diameter is likely to become large, the flow rate of the carbon dioxide gas increases, on the other hand, when the coating diameter is likely to become small, the flow rate of the carbon dioxide gas decreases. As a result, the coating diameter can be controlled at a constant value.

Next, an estimation method of the length of the cooling device 4 which is required for cooling of the bare optical fiber 3 will be described.

The cooling capacity is maximized in a state where the cooling device 4 is connected to the coating device 6 (that is, the flow rate of gas other than the helium gas is set to 0), and in a state where the atmosphere in the cooling device 4 is a helium gas atmosphere, the length of the cooling device 4 which can provide a necessary cooling capacity is appropriately selected. For example, the introduction port 4a of the helium gas is installed in the lower portion of the cooling device 4 or the upper portion of the connection component 5, the helium gas of 5.0 (Standard Liters per Minute; SLM) flows into the cooling device 4, and the length of the cooling device 4 which can provide the necessary cooling capacity is determined.

Generally, since the necessary length of the cooling device 4 is changed according to the structure of the cooling device 4 (the inner diameter, the shape of an inner wall surface, material of the inner wall, temperature of the cooling water), general determination thereof is difficult. However, it is necessary for the cooling device 4 to cool the bare optical fiber to a necessary temperature at the maximum drawing velocity which is considered to obtain an at least good quality optical fiber which is manufactured and in an ideal state where the density of the helium gas is high.

The optical fiber manufacturing method according to this embodiment may be applied to the maximum thawing velocity capable of cooling the bare optical fiber, and particularly, does not depend on the structure or the length of the cooling device 4.

Figure 3:
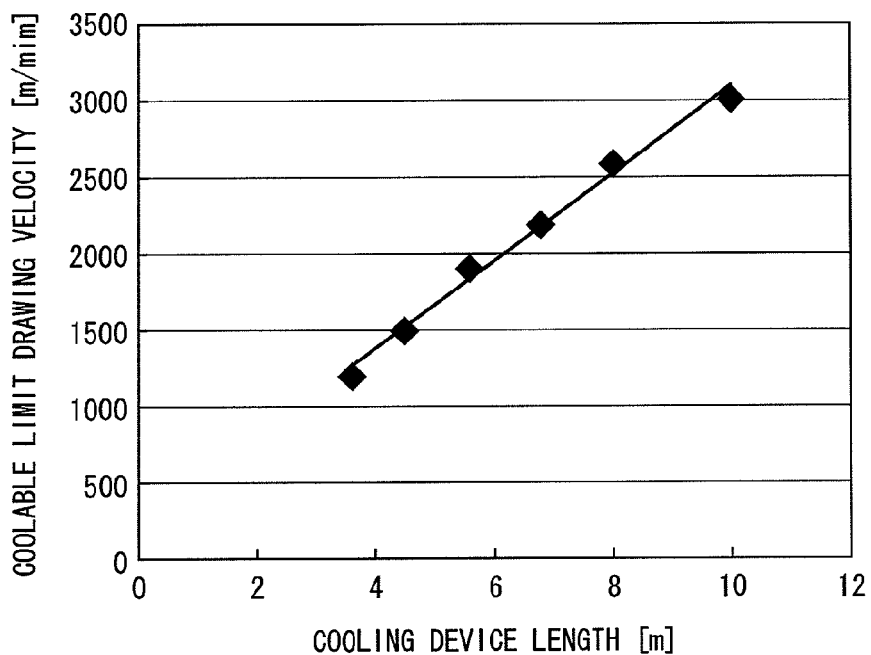
FIG. 3 is a graph illustrating an experimental result for the relationship between the length of a cooling device and a coolable limit drawing velocity.

Here, in a case where the cooling device shown in FIG. 2 is used, a verification result for the drawing velocity dependence property of the required length of the cooling device is shown in FIG. 3. The graph of FIG. 3 illustrates a test result for the relationship between the length of the cooling device and the coolable limit drawing velocity. As the cooling device 4, a pipe made of brass having an inner diameter of 10 mm is used. Further, water of 20° C. is used as the cooling water which circulates in the inside of the cyclic water tube 14b.

Figure 4:
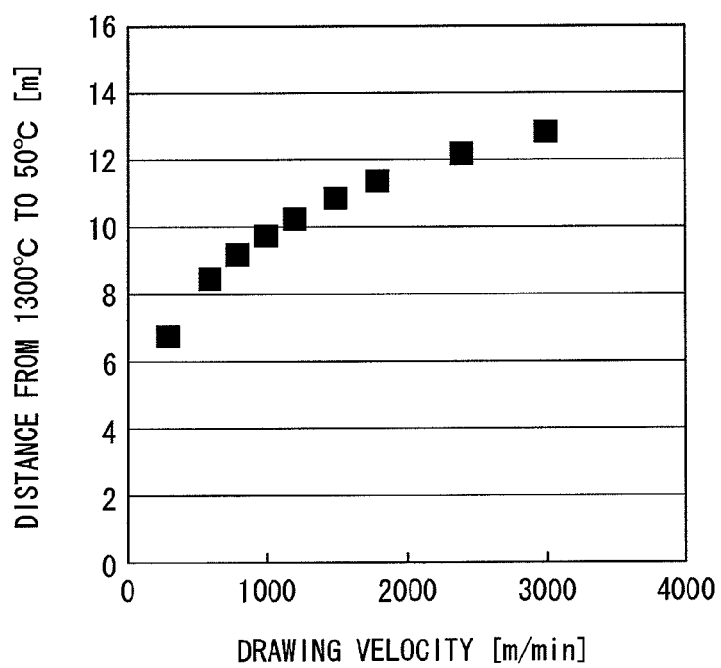
FIG. 4 is a graph illustrating a result obtained by measuring the temperature of a bare optical fiber exiting from a heating furnace with a radiation thermometer.

Further, in a case where the bare optical fiber exiting from the heating furnace runs in the air without using the cooling device, the verification result for the relationship between the distance and the drawing velocity until the temperature of the bare optical fiber reaches 50° C. is shown in FIG. 4. The graph of FIG. 4 illustrates the result obtained by measuring the temperature of the bare optical fiber exiting from the heating furnace by the radiation thermometer.

From the above-described results, it can be found that in a case where the required length of the cooling device 4 is set to the maximum (only helium gas is used as the cooling gas), if the drawing velocity is lower than or equal to the maximum drawing velocity in the case, the carbon dioxide gas is mixed according to the drawing velocity, and thus, it is possible to cool the bare optical fiber up to the temperature at which the protective cover layer can be coated while preventing the temperature of the bare optical fiber from being excessively lowered. Further, it can be found that even in a case where the bare optical fiber can be air-cooled using the length of the cooling device, if the drawing velocity is in a range where the temperature of the bare optical fiber is not excessively lowered, the temperature of the bare optical fiber can be controlled at a constant value. Thus, as the amount of the flowing gas is changed according to the length of the cooling device, the bare optical fiber can be cooled in a wide drawing velocity range. For example, in a case where the length of the cooling device 4 is set to 10 m, as understood from FIG. 3, the flow rate of the cooling gas is adjusted, to thereby cool the bare optical fiber up to the maximum drawing velocity of about 3000 (m/min). On the other hand, in a case where the gas is not used, as understood from FIG. 4, the bare optical fiber can be cooled up to the maximum drawing velocity of about 1000 (m/min). That is, in a case where the length of the cooling device is 10 m, as the flow rate of the cooling gas is appropriately adjusted, the bare optical fiber can be cooled in the range of the drawing velocity 1000 to 3000 (m/min) at the maximum.

Next, a fluctuation range of the flow rate of the helium gas in the cooling device 4 will be described.

In the maximum drawing velocity $V_{max}$ of the optical fiber 11, the flow rate of the carbon dioxide gas flowing into the upper portion of the coating device 6 or the lower portion of the connection component 5 is set to about 0.03 to 0.5 (SLM), to confirm the flow rate (5 (SLM) or lower) of the helium gas in which the coating diameter of the optical fiber 11 is a target coating diameter. Further, the flow rate is set to a flow rate $X_1$ (SLM) of the helium gas in the maximum drawing velocity $V_{max}$.

Further, in a manufacturing center drawing velocity (normal fiber drawing velocity) $V_{center}$ of the optical fiber 11, the flow rate of the carbon dioxide gas flowing into the upper portion of the coating device 6 or the lower portion of the connection component 5 is set to about 0.03 to 0.5 (SLM), to confirm the flow rate of the helium gas in which the coating diameter of the optical fiber 11 is a target coating diameter.

Further, the flow rate is set to a flow rate $X_2$ (SLM) of the helium gas in the manufacturing center drawing velocity $V_{center}$.

Further, in a minimum drawing velocity $V_{min}$ of the optical fiber 11, the flow rate of the carbon dioxide gas flowing into the upper portion of the coating device 6 or the lower portion of the connection component 5 is set to about 0.03 to 0.5 (SLM), to confirm the flow rate of the helium gas in which the coating diameter of the optical fiber 11 is a target coating diameter. Further, the flow rate is set to a flow rate $X_3$ (SLM) of the helium gas in the minimum drawing velocity $V_{min}$.

The relationship of the flow rate of the helium gas corresponds to "$X_3 \leq X_2 \leq X_1 < 5$".

Figure 5:
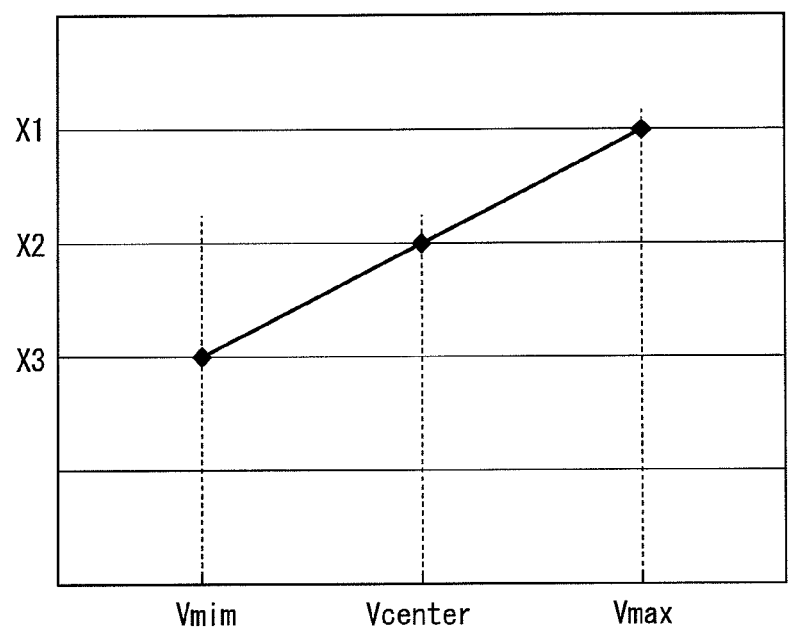
FIG. 5 is a graph in a case where the relationship between the drawing velocity V of the optical fiber and the flow rate X of helium gas is expressed as a linear function.

From the relationship of the above description, the flow rate X (SLM) of the helium gas is adjusted according to the drawing velocity V (m/min) of the optical fiber 11. In a case where the flow rate X (SLM) of the helium gas is adjusted, the function is not particularly limited, but the function may be a linear function or a quadratic function. Here, the linear function is preferable. FIG. 5 illustrates a graph in a case where the relationship between the drawing velocity V (m/min) of the optical fiber 11 and the flow rate X (SLM) of the helium gas is expressed as the linear function.

At this time, the above-described $V_{max}, V_{center}, V_{min}, V, X_1, X_2, X_3$ and X satisfy the following equation (1) or (2).

$$X = \frac{X_1 - X_2}{V_{max} - V_{center}} V + \frac{V_{max} X_2 - V_{center} X_1}{V_{max} - V_{center}} \quad (V_{center} \leq V \leq V_{max}) \quad (1)$$

$$X = \frac{X_2 - X_3}{V_{center} - V_{min}} V + \frac{V_{center} X_3 - V_{min} X_2}{V_{center} - V_{min}} \quad (V_{min} \leq V \leq V_{center}) \quad (2)$$

Next, control properties of the coating diameter of the optical fiber 11 will be described.

In a state where the flow rate of the helium gas is controlled by the drawing velocity signal, the flow rate of the carbon dioxide gas flowing into the upper portion of the coating device 6 or the lower portion of the connection component 5 is feedback controlled by the coating diameter signal. At this time, it is confirmed whether the coating diameter can be controlled at a constant value over an allowable drawing velocity range without the flow rate of the carbon dioxide gas being "0".

As described above, as a result of checking the fluctuation range of the flow rate of the helium gas in the cooling device 4 and the control properties of the coating diameter of the optical fiber 11, the flow rate of the helium gas in the cooling device 4 is 5.0 (SLM) or lower, and the flow rate of the carbon dioxide gas in the cooling device 4 is 2.0 (SLM) or lower. Thus, it is confirmed that the maximum gas flow rate in the cooling device 4 is 7.0 (SLM) and the gas flow rate does not reach a level at which fiber vibration of the bare optical fiber 3 is caused.

Further, in a region where the drawing velocity is high and in a region where the drawing velocity is slow, the flow rate of the carbon dioxide gas flowing into the upper portion of the coating device 6 or the lower portion of the connection component 5 does not become 0.03 (SLM) or lower. Thus, the coating diameter can be controlled at a constant value in a very wide drawing velocity range, without mixing or residue of bubbles into the protective cover layer.

In the optical fiber manufacturing method according to this embodiment in this way, the signals for controlling the flow rate of the helium gas and the flow rate of the carbon dioxide gas are independent signals, respectively (drawing velocity signal and coating diameter signal). Thus, the flow rates of the gases can be individually controlled. Further, the flow of the helium gas and the carbon dioxide gas in the cooling device 4 is not changed according to the flow rates of these gases, and ordinarily becomes an upward stream. For this reason, it is possible to maintain the coating diameter of the optical fiber 11 at a constant value, since good responsiveness is provided and the response for the fluctuation of the drawing velocity is high when adjusting the cooling capacity by changing the ratio of the flow rates of the gases.

Further, since the flow rate of the helium gas increases or decreases according to the drawing velocity signal, the cooling capacity of the cooling device 4 which cools the bare optical fiber 3 can be adjusted, without unnecessarily increasing the flow rate of the carbon dioxide gas.

(2) Second Embodiment

Figure 6:
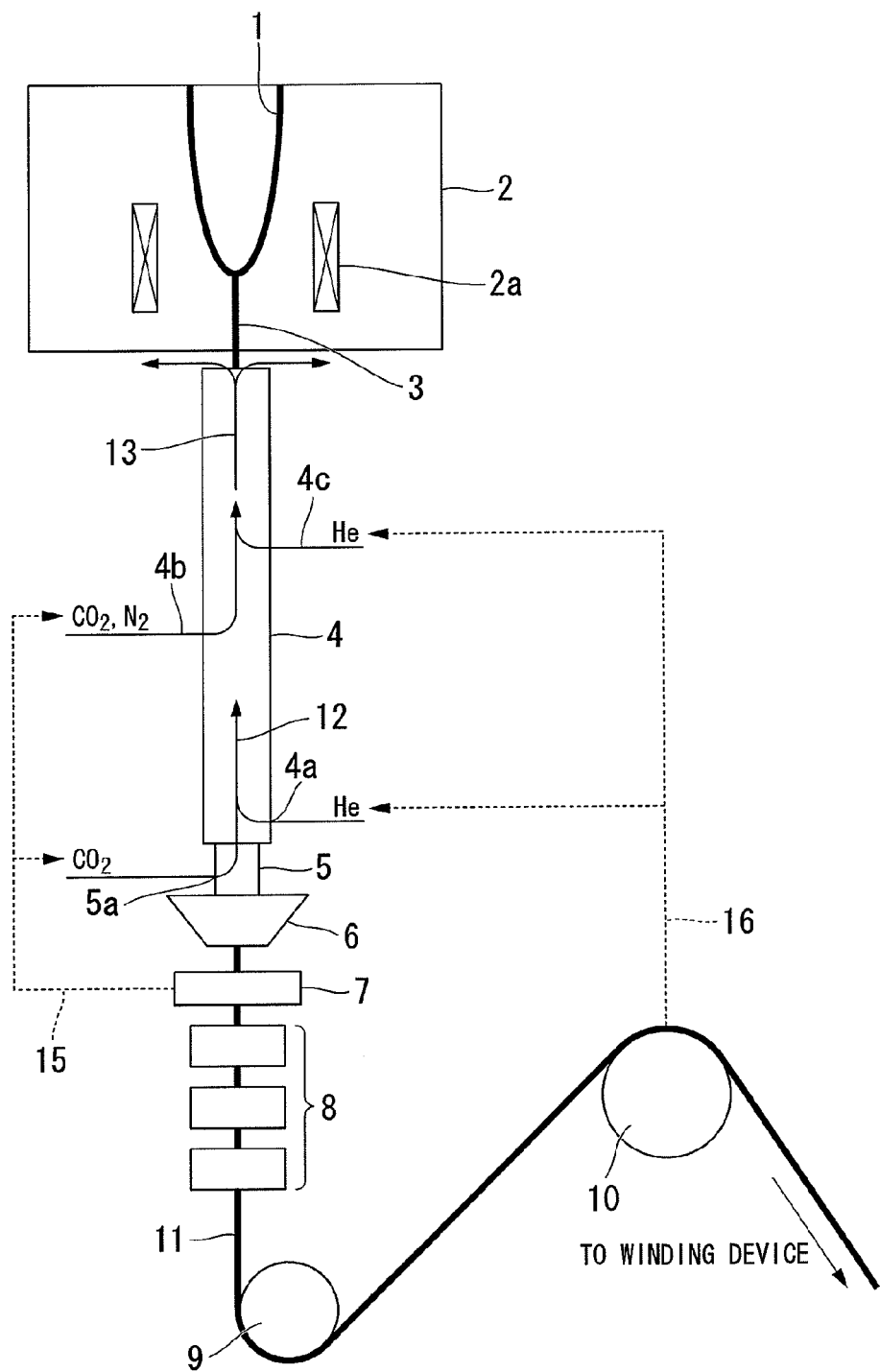
FIG. 6 is a schematic configuration diagram illustrating an optical fiber manufacturing apparatus used in an optical fiber manufacturing method according to a second embodiment of the present invention.

FIG. 6 is a schematic configuration diagram illustrating an optical fiber manufacturing apparatus used in an optical fiber manufacturing method according to a second embodiment of the present invention.

In FIG. 6, the same reference numerals are given to the same components as the components shown in FIG. 1, and a description thereof is omitted.

In the optical fiber manufacturing apparatus according to this embodiment, a different configuration from the first embodiment is in that the introduction port 4b of carbon dioxide gas and/or nitrogen gas is installed in an upper side surface of the cooling device 4, and the introduction port 4c of the helium gas is installed above the introduction port 4b of the upper side surface of the cooling device 4. That is, referring to FIG. 2, for example, in a case where the cooling device 4 is one (in a case where the cooling device 4 includes the pair of cooling tube 14a and circulating water tube 14b), the introduction ports 14c and 14e of the cooling tube 14a are the introduction ports 4c and 4a of the helium gas, respectively, and the introduction port 14d of the cooling tube 14 is the introduction port 4b of the carbon dioxide gas and/or the nitrogen gas. In a case where the plurality of cooling devices 4 is connected, the introduction port 4c of the helium gas and the introduction port 4b of the carbon dioxide gas and/or the nitrogen gas may be appropriately set according to the positions of the respective introduction ports 14c, 14d and 14e of the cooling tube 14. At this time, the respective unused introduction ports 14c, 14d and 14e are closed.

The outer diameter measuring device 7 is connected with a third controller (not shown) through the cable 15. The third controller controls the flow rate of the carbon dioxide gas and/or the flow rate of the nitrogen gas flowing into the cooling device 4 from an introduction port 5a and the introduction port 4b.

The drawing capstan 10 is connected with a fourth controller (not shown) through the cable 16. The fourth controller controls the flow rate of the helium gas flowing into the cooling device 4 from the introduction port 4a and the introduction port 4c.

In this embodiment, by using the helium gas flowing into the lower portion of the cooling device 4 or the upper portion of the connection component 5; the carbon dioxide gas flowing into the upper portion of the coating device 6 or the lower portion of the connection component 5; and the carbon dioxide gas, the nitrogen gas or the helium gas flowing into the upper portion of the cooling device 4, the flow rates of these gases are controlled to adjust the cooling efficiency (cooling capacity) of the cooling device 4.

For example, the helium gas flows into the lower portion of the cooling device 4 or the upper portion (introduction port 4a) of the connection component 5, and the helium gas flows into the upper portion (introduction port 4c) of the cooling device 4. In this case, in a region where the temperature of the bare optical fiber 3 is high in an upper portion of the introduction port 4c, that is, near the heating furnace 2, the cooling efficiency of the bare optical fiber 3 can be enhanced. Thus, when the drawing velocity is particularly high, the bare optical fiber 3 can be effectively cooled. Further, since the atmosphere in the upper portion of the coating device 6 is not influenced, mixture of the bubbles into the protective cover layer can be suppressed.

Further, for example, the carbon dioxide gas flows into the upper portion of the coating device 6 or the lower portion of the connection component 5 (introduction port 5a) and the carbon dioxide gas and/or the nitrogen gas flows into the upper portion (introduction port 4b) of the cooling device 4. In this case, in the upper portion of the introduction port 4b, that is, in a region where the temperature of the bare optical fiber 3 is high near the heating furnace 2, the cooling efficiency of the bare optical fiber 3 can be lowered. Thus, it is effective, particularly when the drawing velocity is slow. Further, since the atmosphere in the upper portion of the coating device 6 is not influenced, mixture of the bubbles into the protective cover layer can be suppressed. These gases do not affect the flames of the heating furnace 2.

Furthermore, the flow rate of the carbon dioxide gas and/or the nitrogen gas and the flow rate of the helium gas, flowing into the upper portion of the cooling device 4, may be controlled by two types or more of independent signals. As the two types or more of independent signals, a drawing velocity signal indicating the drawing velocity of the optical fiber 11 and a coating diameter signal indicating the coating diameter of the optical fiber 11 are used.

For example, particularly, in a case where the drawing velocity of the optical fiber 11 is in a high speed region (around the maximum drawing velocity $V_{max}$), the cooling device 4 requires a high cooling capacity. Thus, the flow rate of the helium gas flowing into the upper portion of the cooling device 4 is increased according to the drawing velocity signal.

In this case, the drawing velocity range of the optical fiber 11 is divided so that the flow rate of the helium gas flowing into the lower portion of the cooling device 4 or the upper portion of the connection component 5 and the flow rate of the helium gas flowing into the upper portion of the cooling device 4 are not changed together with respect to the same drawing velocity signal, only to change the flow rate of any one helium gas. That is, in a drawing velocity range of $V_{min}$ to ($V_{max}$-α), the helium gas flowing into the lower portion of the cooling device 4 or the upper portion of the connection component 5, that is, only the flow rate of the helium gas flowing into the introduction port 4a is changed. On the other hand, in a drawing velocity range of ($V_{max}$-α) to $V_{max}$, the helium gas flowing into the upper portion of the cooling device 4, that is, only the flow rate of the helium gas flowing into the introduction port 4c is changed. Here, α indicates the maximum drawing velocity at which the cooling can be performed by only one type of helium gas in a case where the carbon dioxide gas flows at the minimum.

Further, in a case where the drawing velocity of the optical fiber 11 is in a lower speed region (around the minimum drawing velocity $V_{min}$), the cooling device 4 does not require a high cooling capacity. Thus, the flow rate of the carbon dioxide gas and/or the flow rate of the nitrogen gas flowing into the upper portion of the cooling device 4 is increased according to the coating diameter signal.

In this case, the drawing velocity range of the optical fiber 11 is divided so that the flow rate of the carbon dioxide gas flowing into the upper portion of the coating device 6 or the lower portion of the connection component 5 and the flow rate of the carbon dioxide gas and/or the flow rate of the nitrogen gas flowing into the upper portion of the cooling device 4 are not changed together with respect to the same coating diameter signal, to change the flow rates of these gases. That is, in a drawing velocity range of $V_{min}$ to ($V_{min}$-β), the gas flowing into the upper portion of the cooling device 4, that is, only the flow rate of the carbon dioxide gas and/or the flow rate of the nitrogen gas flowing from the introduction port 4b is changed. On the other hand, in a drawing velocity range of ($V_{min}$-β) to $V_{max}$, the gas flowing into the upper portion of the coating device 6 or the lower portion of the connection component 5, that is, only the flow rate of the carbon dioxide gas flowing into the introduction port 5a is changed. Here, β indicates the minimum drawing velocity at which the coating system can be controlled in a constant manner only by one type of the carbon dioxide gas in a case where the carbon dioxide gas flows at the maximum.

In this way, in a case where the type of the gas controlled according to the drawing velocity or flowing locations are controlled individually, in this embodiment, a total of four types of control are performed if each control is considered as one type.

In this embodiment, the introduction port 4b of carbon dioxide gas and/or the nitrogen gas is installed in the upper side surface of the cooling device 4, and the introduction port 4c of the helium gas is installed above the introduction port 4b of the upper side surface of the cooling device 4, but the invention is not limited thereto. In the present invention, one, two or more types of gases selected from the helium gas, the carbon dioxide gas and the nitrogen gas may flow into one introduction port installed on the upper side surface of the cooling device.

EXAMPLES

Hereinafter, the present invention will be described in detail with reference to examples, but the present invention is not limited to the following examples.

First Example

In the apparatus configuration shown in FIG. 1, the optical fiber is drawn at a center drawing velocity of 1800 (m/min) to manufacture the optical fiber.

The cooling device which is not connected with the heating furnace is connected with the coating device by the connection component. Piping is configured so that the helium gas flows into a lower portion of the cooling device and the carbon dioxide gas flows into an upper portion (lower portion of the connection component) of the coating device.

As the cooling device, six cylindrical cooling tubes having an inner diameter of 10 mm and a length of 1 m which are made of brass and are connected with each other are used, and the cooling length of the cooling device is set to 6 m. Further, the temperature of the cooling water which circulates in the inside of the circulating water tube which forms the cooling device is constantly set to 20° C.

The length of the connection component is 300 mm.

Such a connection component may be used, but the present invention is not limited thereto. For example, the cooling device and the coating device may be integrated.

Further, the flow rate of the helium gas flowing into the lower portion of the cooling device is linearly controlled by the drawing velocity signal, and the flow rate of the carbon dioxide gas flowing into the upper portion of the coating device is feedback controlled by the coating diameter signal.

Further, the gas discharged from the upper portion of the cooling device is recovered by a recovery device, and the recovered gas is separated for reuse.

The drawing velocity when the fiber drawing is started is adjusted to 800 (m/min), and then a good quality optical fiber starts to be manufactured as a product.

Thereafter, the manufacturing center drawing velocity is automatically increased to 1800 (m/min) for one hour. In this state, 1300 km of the optical fiber is drawn while maintaining the drawing velocity fluctuation range of ±200 (m/min). Then, after the drawing velocity is automatically decreased to 800 (m/min) for one hour, the fiber drawing of the optical fiber is ended.

The good quality portion of the optical fiber at this time is 1500 km in total. Further, over all the drawing velocities of 800 (m/min) to 2000 (m/min), the coating diameter of the manufactured optical fiber becomes a constant 195 µm which is a target value, and it is possible to obtain desirable control properties (responsiveness) without mixing of bubbles into the protective cover layer.

Further, the length as a faulty portion of the optical fiber used for the fiber drawing start is about 15 km, which is very short.

The drawing velocity and the gas flow rate at the time of the fiber drawing are as follows, and the flow rate of the helium gas linearly increases and decreases.

The minimum drawing velocity $V_{min}$ is 800 (m/min), and at this time, the flow rate of the helium gas is 0.2 (SLM), and the flow rate of the carbon dioxide gas is 1.8 (SLM).

The normal fiber drawing velocity $V_{center}$ is 1800 (m/min), and at this time, the flow rate of the helium gas is 1.5 (SLM), and the flow rate of the carbon dioxide gas is 0.2 (SLM).

The maximum drawing velocity $V_{max}$ is 2000 (m/min), and at this time, the flow rate of the helium gas is 2.0 (SLM), and the flow rate of the carbon dioxide gas is 0.2 (SLM).

Figure 7:
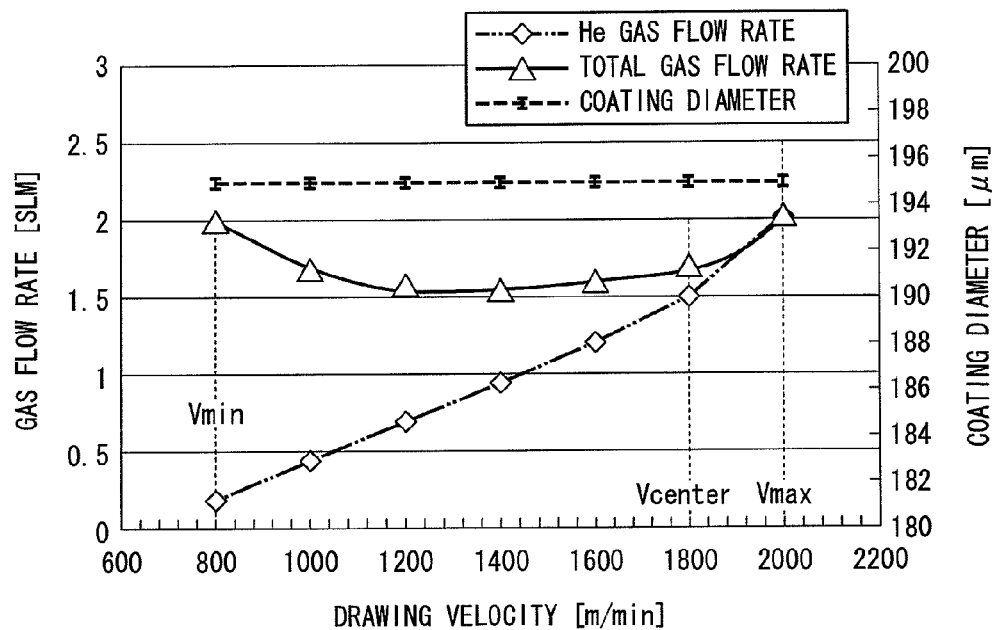
FIG. 7 is a graph illustrating the relationship between the drawing velocity, the flow rate of gas and the coating diameter in a first example.

The relationship of the drawing velocity, the gas flow rate and the coating diameter is shown in FIG. 7.

First Comparative Example

In a first comparative example, the optical fiber is manufactured in a similar way to the first example, except that piping is configured so that the helium gas and the carbon dioxide gas flow into the lower portion of the cooling device, the total amount of the flow rate of the helium gas and the flow rate of the carbon dioxide gas are maintained at constant values, and the gas flow rates are controlled at constant values by the drawing velocity signal.

The drawing velocity when the fiber drawing is started is adjusted to 800 (m/min), and then a good quality optical fiber starts to be manufactured as a product.

Thereafter, the manufacturing center drawing velocity is automatically increased to 1800 (m/min) for one hour. In this state, 1300 km of the optical fiber is drawn while maintaining the drawing velocity fluctuation range to ±200 (m/min). Then, after the drawing velocity is automatically decreased to 800 (m/min) for one hour, the fiber drawing of the optical fiber is ended.

The good quality portion of the optical fiber at this time is 500 km in total. Further, over all the drawing velocity range of 800 (m/min) to 2000 (m/min), the coating diameter of the manufactured optical fiber is not constantly maintained as 195 µm which is a target value, and thus, deficiency and difficulty in setting of the gas conditions are found. Further, since a mixture of the helium gas and the carbon dioxide gas is introduced to the cooling device, the density of the carbon dioxide gas in the upper portion of the coating device is lowered, and mixing of bubbles into the protective cover layer is found.

Further, since the manufactured optical fiber is considered as a good product from the drawing velocity of 800 (m/min), the length as a faulty portion of the optical fiber used for the fiber drawing start is approximately 15 km, which is very short.

The drawing velocity and the gas flow rate at the time of the fiber drawing are as follows, and the flow rate of the helium gas increases and decreases linearly.

The minimum drawing velocity $V_{min}$ is 800 (m/min), and at this time, the flow rate of the helium gas is 0 (SLM), and the flow rate of the carbon dioxide gas is 2.0 (SLM).

The normal fiber drawing velocity $V_{center}$ is 1800 (m/min), and at this time, the flow rate of the helium gas is 1.7 (SLM), and the flow rate of the carbon dioxide gas is 0.3 (SLM).

The maximum drawing velocity $V_{max}$ is 2000 (m/min), and at this time, the flow rate of the helium gas is 2.0 (SLM), and the flow rate of the carbon dioxide gas is 0 (SLM).

Figure 8:
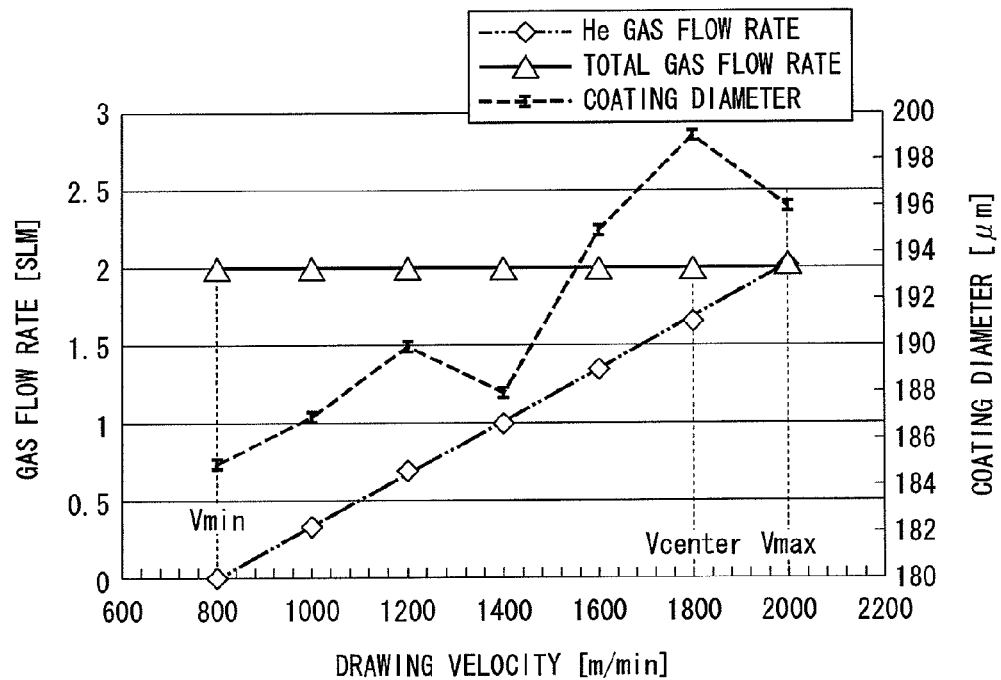
FIG. 8 is a graph illustrating the relationship between the drawing velocity, the flow rate of gas and the coating diameter in a first comparative example.

The relationship of the drawing velocity, the gas flow rate and the coating diameter is shown in FIG. 8.

Second Comparative Example

In a second comparative example, the optical fiber is manufactured in a similar way to the first example, except that only the flow rate of the carbon dioxide gas flowing into the upper portion of the coating device is feedback controlled by the coating diameter signal.

The drawing velocity when the fiber drawing is started is adjusted to 800 (m/min), and then a good quality optical fiber starts to be manufactured as a product.

Thereafter, the manufacturing center drawing velocity is automatically increased to 1800 (m/min) for one hour. In this state, 1300 km of the optical fiber is drawn while maintaining the drawing velocity fluctuation range to ±200 (m/min). Then, after the drawing velocity is automatically decreased to 800 (m/min) for one hour, the fiber drawing of the optical fiber is ended.

The good quality portion of the optical fiber at this time is 1000 km in total. Further, at the drawing velocity of 1500 (m/min) or lower, the control properties of the coating diameter according to the flow rate increase of the carbon dioxide gas are decreased and the coating diameter fluctuates. Further, at the drawing velocity of 1000 (m/min) or lower, the total amount of the gas flow rates in the cooling device is increased, fiber vibration occurs, and the coating diameter fluctuates. Furthermore, since the manufactured optical fiber is considered as a good product from the thawing velocity of 800 (m/min), the length as a faulty portion of the optical fiber used for the fiber drawing start is about 15 km, which is very short.

The drawing velocity and the gas flow rate at the time of the fiber thawing are as follows, and the flow rate of the helium gas is maintained at a constant value.

The minimum drawing velocity $V_{min}$ is 800 (m/min), and at this time, the flow rate of the helium gas is 2.0 (SLM), and the flow rate of the carbon dioxide gas is 25 (SLM).

The normal fiber drawing velocity $V_{center}$ is 1800 (m/min), and at this time, the flow rate of the helium gas is 2.0 (SLM), and the flow rate of the carbon dioxide gas is 0.5 (SLM).

The maximum thawing velocity $V_{max}$ is 2000 (m/min), and at this time, the flow rate of the helium gas is 2.0 (SLM), and the flow rate of the carbon dioxide gas is 0.03 (SLM).

Figure 9:
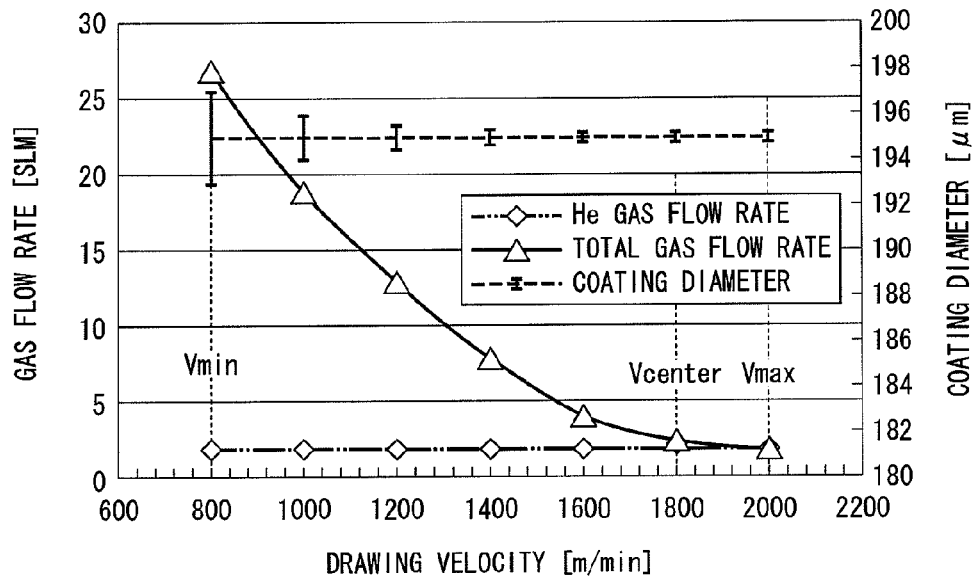
FIG. 9 is a graph illustrating the relationship between the drawing velocity, the flow rate of gas and the coating diameter in a second comparative example.

The relationship of the drawing velocity, the gas flow rate and the coating diameter is shown in FIG. 9.

Results of the first example, the first comparative example and the second comparative example will be described.

In the first example, the first comparative example and the second comparative example, evaluations are all performed in a state where the cooling device and the coating device are connected by the connection component.

In the first example, two types of control signals are used. In the first comparative example, the total amount of the gas flow rates is constant. In the second comparative example, the flow rate of the helium gas is fixed, and the flow rate of the carbon dioxide gas is variable.

In the graphs shown in FIGS. 7 to 9, the flow rate (left longitudinal axis) of the helium gas with respect to the drawing velocity (transverse axis), the total amount (left longitudinal axis) of the gas flow rate in the cooling device with respect to the drawing velocity, and the coating diameter (right longitudinal axis) with respect to the drawing velocity are shown.

From the result of FIG. 7, in the first example, since the two types of controls are performed over all the drawing velocity range of 800 (m/min) to 2000 (m/min), the optical fiber can be manufactured, in which the total amount of the gas flow rates is small and thus fiber vibration does not occur. As a result, the optical fiber having a constant coating diameter is obtained. Further, in the first example, it can be understood that the manufacturing method is preferable in that the responsiveness to the cooling capacity change is good, without mixing of bubbles into the protective cover layer.

From the result of FIG. 8, in the first comparative example, since the total amount of the gas flow rates is constant, it is difficult to appropriately change the flow rate of each gas for the change in the drawing velocity, and to appropriately change the cooling capacity of the cooling device. As a result, the manufactured optical fiber fluctuates in the coating diameter range of 185 to 199 µm. This is considered to be caused by the fact that the change in the cooling capacity for the change of the gas flow rate becomes significant by connecting the cooling device and the coating device by the connection component. Further, since the mixture gas of the helium gas and the carbon dioxide gas flows into the cooling device, the frequency of mixing of bubbles to the protective cover layer is high, and thus, it is difficult to obtain a desirable optical fiber.

From the result of FIG. 9, in the second comparative example, since the flow rate of the helium gas is fixed and the flow rate of the carbon dioxide gas is variable, it is possible to make the coating diameter of the optical fiber constant over the drawing velocity range of 800 (m/min) to 2000 (m/min). However, since the flow rate of the helium gas is fixed, the flow rate of the carbon dioxide gas is increased in a slow drawing velocity region. Thus, the Reynolds number is increased in the cooling device, and fiber vibration occurs in the optical fiber, and thus, the fluctuation of the coating diameter becomes significant.

From the above results, it can be understood that since the two types of control methods in the first example do not have a significant increase in the gas flow rate, the responsiveness to the cooling capacity change according to the change in the gas flow rate is excellent, without fiber vibration of the bare optical fiber or mixing of bubbles into the protective cover layer.

Second Example

In the apparatus configuration shown in FIG. 1, the optical fiber is drawn at a center drawing velocity of 2400 (m/min) to manufacture the optical fiber.

The cooling device which is not connected with the heating furnace is connected with the coating device by the connection component. Piping is configured so that the helium gas flows into the lower portion of the cooling device and the carbon dioxide gas flows into the upper portion (lower portion of the connection component) of the coating device.

As the cooling device, six cylindrical cooling tubes having an inner diameter of 15 mm and a length of 1.5 m which are made of brass and are connected with each other are used, and the cooling length of the cooling device is set to 9 m. Further, the temperature of the cooling water which circulates in the inside of the circulating water tube which forms the cooling device is constantly set to 30° C.

The length of the connection component is 400 mm.

Further, the flow rate of the helium gas flowing into the lower portion of the cooling device is linearly controlled by the drawing velocity signal, and the flow rate of the carbon dioxide gas flowing into the upper portion of the coating device is feedback controlled by the coating diameter signal.

The drawing velocity when the fiber drawing is started is adjusted to 1000 (m/min), and then a good quality optical fiber starts to be manufactured as a product.

Thereafter, the manufacturing center drawing velocity is automatically increased to 2400 (m/min) for 1.25 hours. In this state, 1300 km of the optical fiber is drawn while maintaining the drawing velocity fluctuation range to ±300 (m/min). Then, after the drawing velocity is automatically decreased to 1000 (m/min) for 1.25 hours, the fiber drawing of the optical fiber is ended.

The good quality portion of the optical fiber at this time is 1500 km in total. Further, over all the drawing velocity range of 1000 (m/min) to 2700 (m/min), the coating diameter of the manufactured optical fiber is maintained constant as 195 µm which is a target value, it is possible to obtain desirable control properties (responsiveness) without mixing of bubbles into the protective cover layer.

Further, the length as a faulty portion of the optical fiber used for the fiber drawing start is about 18 km, which is very short.

The drawing velocity and the gas flow rate at the time of the fiber drawing are as follows, and the flow rate of the helium gas linearly increases and decreases.

The minimum drawing velocity $V_{min}$ is 1000 (m/min), and at this time, the flow rate of the helium gas is 0.1 (SLM), and the flow rate of the carbon dioxide gas is 1.6 (SLM).

The normal fiber drawing velocity $V_{center}$ is 2400 (m/min), and at this time, the flow rate of the helium gas is 1.2 (SLM), and the flow rate of the carbon dioxide gas is 0.2 (SLM).

The maximum drawing velocity $V_{max}$ is 2700 (m/min), and at this time, the flow rate of the helium gas is 2.0 (SLM), and the flow rate of the carbon dioxide gas is 0.05 (SLM).

Figure 10:
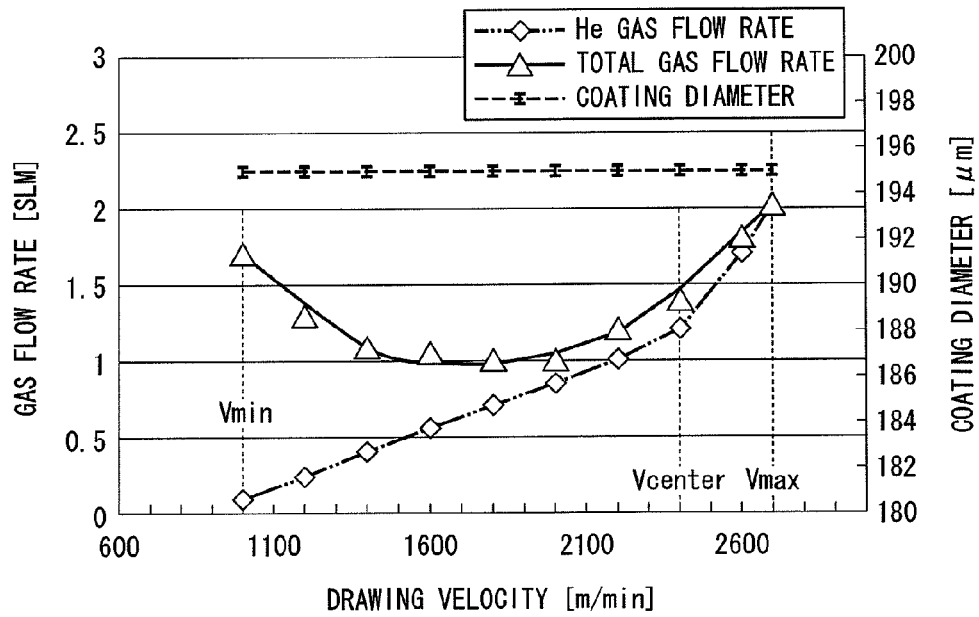
FIG. 10 is a graph illustrating the relationship between the drawing velocity, the flow rate of gas and the coating diameter in a second example.

The relationship of the drawing velocity, the gas flow rate and the coating diameter is shown in FIG. 10.

Third Example

In the apparatus configuration shown in FIG. 1, the optical fiber is drawn at a center drawing velocity of 2700 (m/min) to manufacture the optical fiber.

The cooling device which is not connected with the heating furnace is connected with the coating device by the connection component. Piping is configured so that the helium gas flows into the lower portion of the cooling device and the carbon dioxide gas flows into the upper portion (lower portion of the connection component) of the coating device.

As the cooling device, five cylindrical cooling tubes having an inner diameter of 20 mm and a length of 2 m which are made of brass and are connected with each other are used, and the cooling length of the cooling device is set to 10 m. Further, the temperature of the cooling water which circulates in the inside of the circulating water tube which forms the cooling device is set to a constant 15° C.

Further, piping is configured so that mixture gas of the helium gas and the nitrogen gas independently flows into a lower portion of the first tube from the top of the cooling device.

The length of the connection component is 600 mm.

Further, the flow rate of the helium gas flowing into the lower portion of the cooling device is linearly controlled by the drawing velocity signal in the drawing velocity range of 1500 to 2800 (m/min). The flow rate of the helium gas flowing into the upper portion of the cooling device is linearly controlled by the drawing velocity signal in the drawing velocity range of 2800 to 3000 (m/min).

Further, the flow rate of the carbon dioxide gas flowing into the upper portion of the coating device is feedback controlled by the coating diameter signal in the drawing velocity range of 1500 to 3000 (m/min). The flow rate of the nitrogen gas flowing into the upper portion of the cooling device is feedback controlled by the coating diameter signal in the drawing velocity range of 1000 to 1500 (m/min).

The drawing velocity when the fiber drawing is started is adjusted to 1000 (m/min), and then a good quality optical fiber starts to be manufactured as a product.

Thereafter, the manufacturing center drawing velocity is automatically increased to 2700 (m/min) for 2 hours. In this state, the optical fiber is drawn by 1200 km while maintaining the drawing velocity fluctuation range to ±300 (m/min). Then, after the drawing velocity is automatically decreased to 1000 (m/min) for 2 hours, the fiber drawing of the optical fiber is ended.

The good quality portion of the optical fiber at this time is 1500 km in total. Further, over all the drawing velocity range of 1000 (m/min) to 3000 (m/min), the coating diameter of the manufactured optical fiber is maintained constant as 195 μm which is a target value, it is possible to obtain desirable control properties (responsiveness) without mixing of bubbles into the protective cover layer.

Further, the length as a faulty portion of the optical fiber used for the fiber drawing start is about 18 km, which is very short.

The drawing velocity and the gas flow rate at the time of the fiber drawing are as follows, and the flow rate of the helium gas linearly increases and decreases.

The minimum drawing velocity $V_{min2}$ is 1000 (m/min), and at this time, the flow rate of the helium gas flowing into the lower portion of the cooling device is 0 (SLM), the flow rate of the helium gas flowing into the upper portion of the cooling device is 0 (SLM), the flow rate of the carbon dioxide gas flowing into the upper portion of the coating device is 2.0 (SLM), and the flow rate of the nitrogen gas flowing into the upper portion of the cooling device is 1.0 (SLM).

The minimum drawing velocity $V_{min}$ is 1500 (m/min), and at this time, the flow rate of the helium gas flowing into the lower portion of the cooling device is 0.5 (SLM), the flow rate of the helium gas flowing into the upper portion of the cooling device is 0 (SLM), the flow rate of the carbon dioxide gas flowing into the upper portion of the coating device is 2.0 (SLM), and the flow rate of the nitrogen gas flowing into the upper portion of the cooling device is 0 (SLM).

The normal fiber drawing velocity $V_{center}$ is 2700 (m/min), and at this time, the flow rate of the helium gas flowing into the lower portion of the cooling device is 1.0 (SLM), the flow rate of the helium gas flowing into the upper portion of the cooling device is 0 (SLM), the flow rate of the carbon dioxide gas flowing into the upper portion of the coating device is 0.1 (SLM), and the flow rate of the nitrogen gas flowing into the upper portion of the cooling device is 0 (SLM).

The maximum drawing velocity $V_{max}$ is 2800 (m/min), and at this time, the flow rate of the helium gas flowing into the lower portion of the cooling device is 1.5 (SLM), the flow rate of the helium gas flowing into the upper portion of the cooling device is 0 (SLM), the flow rate of the carbon dioxide gas flowing into the upper portion of the coating device is 0.1 (SLM), and the flow rate of the nitrogen gas flowing into the upper portion of the cooling device is 0 (SLM).

The maximum drawing velocity $V_{max2}$ is 3000 (m/min), and at this time, the flow rate of the helium gas flowing into the lower portion of the cooling device is 1.5 (SLM), the flow rate of the helium gas flowing into the upper portion of the cooling device is 0.5 (SLM), the flow rate of the carbon dioxide gas flowing into the upper portion of the coating device is 0.1 (SLM), and the flow rate of the nitrogen gas flowing into the upper portion of the cooling device is 0 (SLM).

Figure 11:
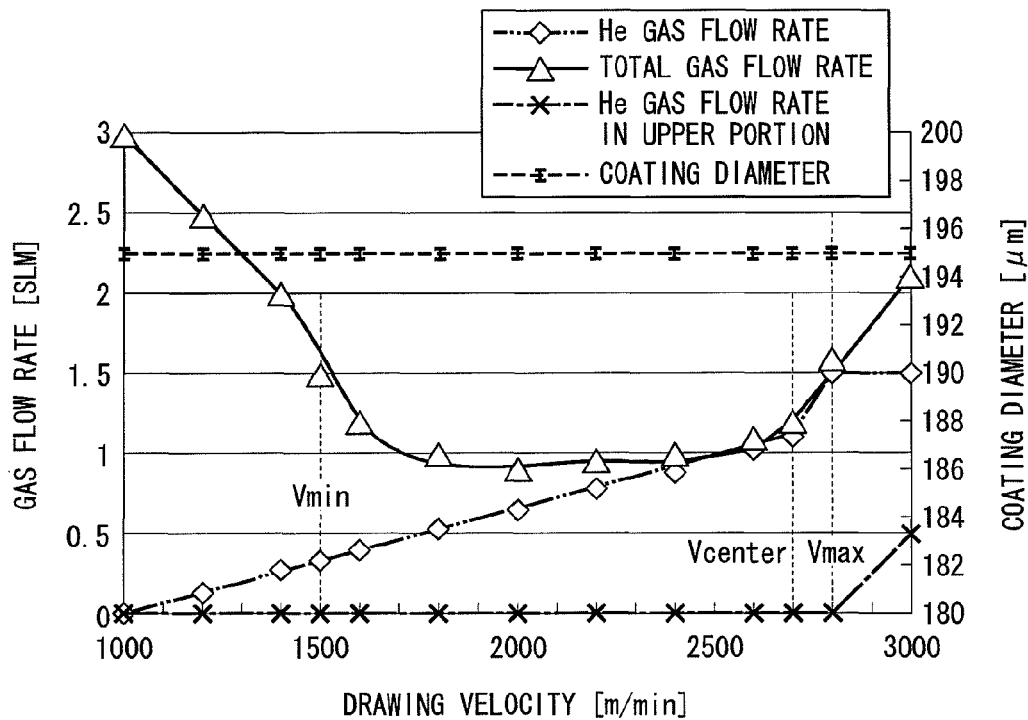
FIG. 11 is a graph illustrating the relationship between the drawing velocity, the flow rate of gas and the coating diameter in a third example.

The relationship of the drawing velocity, the gas flow rate and the coating diameter is shown in FIG. 11.

Fourth Example

In the apparatus configuration shown in FIG. 1, the optical fiber is drawn at a center drawing velocity of 1200 (m/min) to manufacture the optical fiber.

The cooling device which is not connected with the heating furnace is connected with the coating device, not by the connection component, and the length of the connection component is substantially set to 0 mm. Piping is configured so that the helium gas flows into the lower portion of the cooling device and the carbon dioxide gas flows into the upper portion (lower portion of the connection component) of the coating device.

As the cooling device, three cylindrical cooling tubes having an inner diameter of 8 mm and a length of 1.2 m which are made of brass and are connected with each other are used, and the cooling length of the cooling device is set to 3.6 m. Further, the temperature of the cooling water which circulates in the inside of the circulating water tube which forms the cooling device is constantly set to 20° C.

Further, the flow rate of the helium gas flowing into the lower portion of the cooling device is linearly controlled by the drawing velocity signal, and the flow rate of the carbon dioxide gas flowing into the upper portion of the coating device is feedback controlled by the coating diameter signal.

The drawing velocity when the fiber drawing is started is adjusted to 600 (m/min), and then a good quality optical fiber starts to be manufactured as a product.

Thereafter, the manufacturing center drawing velocity is automatically increased to 1200 (m/min) for 0.5 hours. In this state, 1300 km of the optical fiber is drawn while maintaining the drawing velocity fluctuation range to ±150 (m/min). Then, after the drawing velocity is automatically decreased to 600 (m/min) for 0.5 hours, the fiber drawing of the optical fiber is ended.

The good quality portion of the optical fiber at this time is 1500 km in total. Further, over all the drawing velocity range of 600 (m/min) to 1350 (m/min), the coating diameter of the manufactured optical fiber is maintained constant as 195 μm which is a target value, it is possible to obtain desirable control properties (responsiveness) without mixing of bubbles into the protective cover layer.

Further, the length as a faulty portion of the optical fiber used for the fiber drawing start is about 10 km, which is very short.

The drawing velocity and the gas flow rate at the time of the fiber drawing are as follows, and the flow rate of the helium gas linearly increases and decreases.

The minimum drawing velocity $V_{min}$ is 600 (m/min), and at this time, the flow rate of the helium gas is 0 (SLM), and the flow rate of the carbon dioxide gas is 1.5 (SLM).

The normal fiber drawing velocity $V_{center}$ is 1200 (m/min), and at this time, the flow rate of the helium gas is 1.0 (SLM), and the flow rate of the carbon dioxide gas is 0.3 (SLM).

The maximum drawing velocity $V_{max}$ is 1350 (m/min), and at this time, the flow rate of the helium gas is 1.5 (SLM), and the flow rate of the carbon dioxide gas is 0.15 (SLM).

Figure 12:
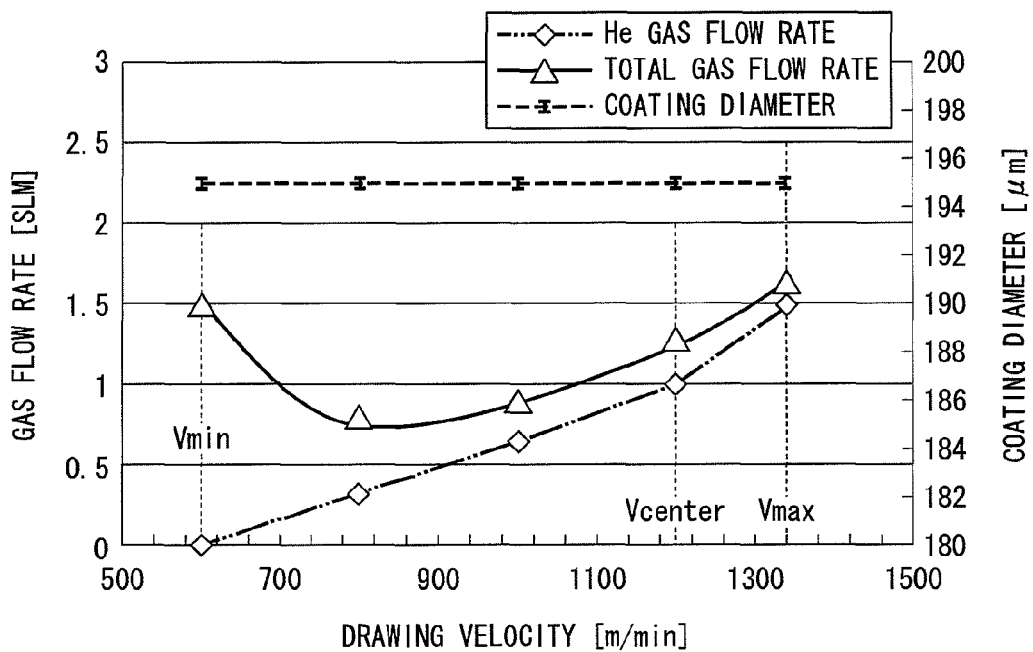
FIG. 12 is a graph illustrating the relationship between the drawing velocity, the flow rate of gas and the coating diameter in a fourth example.

The relationship of the drawing velocity, the gas flow rate and the coating diameter is shown in FIG. 12.

The results of the second to fourth examples will be described.

In the second and third examples, the evaluation is performed in a state where the cooling device is connected with the coating device by the connection component. In the fourth example, the evaluation is performed in a state where the cooling device is directly connected with the coating device, not by using the connection component.

In the second example, the experiment is performed in a drawing velocity region wider than the first example, that is, at a drawing velocity faster than the first example. As a result, in a similar way to the first example, the optical fiber is manufactured without fiber vibration of the bare optical fiber. Thus, the optical fiber having a constant coating diameter is obtained. Further, in the second example, it can be understood that the responsiveness to the cooling capacity change is preferable without mixing of bubbles into the protective cover layer, and thus, the optical fiber manufacturing method according to this example becomes excellent.

In the third example, the experiment is performed by independently introducing the mixture gas of the helium gas and the nitrogen gas into the upper portion of the cooling device. As a result, the optical fiber is manufactured without fiber vibration of the bare optical fiber. Thus, the optical fiber having a constant coating diameter is obtained. Further, in the third example, it can be understood that the responsiveness to the cooling capacity change is preferable without mixing of bubbles into the protective cover layer, and thus, the optical fiber manufacturing method according to this example becomes excellent.

In the fourth example, the experiment is performed by lowering the drawing velocity. As a result, the optical fiber can be manufactured without fiber vibration of the bare optical fiber. Thus, the optical fiber having a constant coating diameter is obtained. Further, in the fourth example, it can be understood that the responsiveness to the cooling capacity change is preferable without mixing of bubbles into the protective cover layer, and thus, the optical fiber manufacturing method according to this example becomes excellent.

From the above-described results, it is confirmed that the two-line control method of the second to fourth examples can be adapted to the wide drawing velocity region.

Further, in the first to fourth examples, the length of the connection component is changed in the range of 0 to 600 mm. Further, the introduction port of the helium gas is installed in the lower portion of the cooling device or in the upper portion of the connection component, and the introduction port of the carbon dioxide gas is installed in the upper portion of the coating device or the lower portion of the connection component, and thus, the experiment is performed by using four patterns obtained by combining the above installations.

Further, the inner diameter of the cooling tube made of brass is changed in the range of 8 to 20 mm, the length of one cooling tube is changed in the range of 1 to 2 m, and the temperature of the circulating water is changed to be within the range of 15 to 30° C. Further, referring to FIG. 3, the optical fiber is manufactured by estimating the necessary length (cooling length) of the cooling device according to the maximum drawing velocity.

Further, the optical fiber is manufactured by idle-running the bare optical fiber in the air using the result of FIG. 4. That is, the drawing velocity of the bare optical fiber becomes the drawing velocity at the time of the air running distance required for cooling the bare optical fiber (for example, in a case where the air running distance is approximately 10 m, the drawing velocity of the bare optical fiber is approximately 1000 (m/min)), conditions are set to control for a constant coating diameter, and a good quality optical fiber starts to be manufactured as a product.

In the above modifications, the optical fiber can be manufactured without fiber vibration of the bare optical fiber. As a result, the optical fiber having a constant coating diameter is obtained. Further, in the first to fourth examples, it can be understood that the responsiveness to the cooling capacity change is preferable mixing of bubbles into the protective cover layer, and thus, the optical fiber manufacturing method according to the first to fourth examples becomes excellent.

Third Comparative Example

Figure 14:
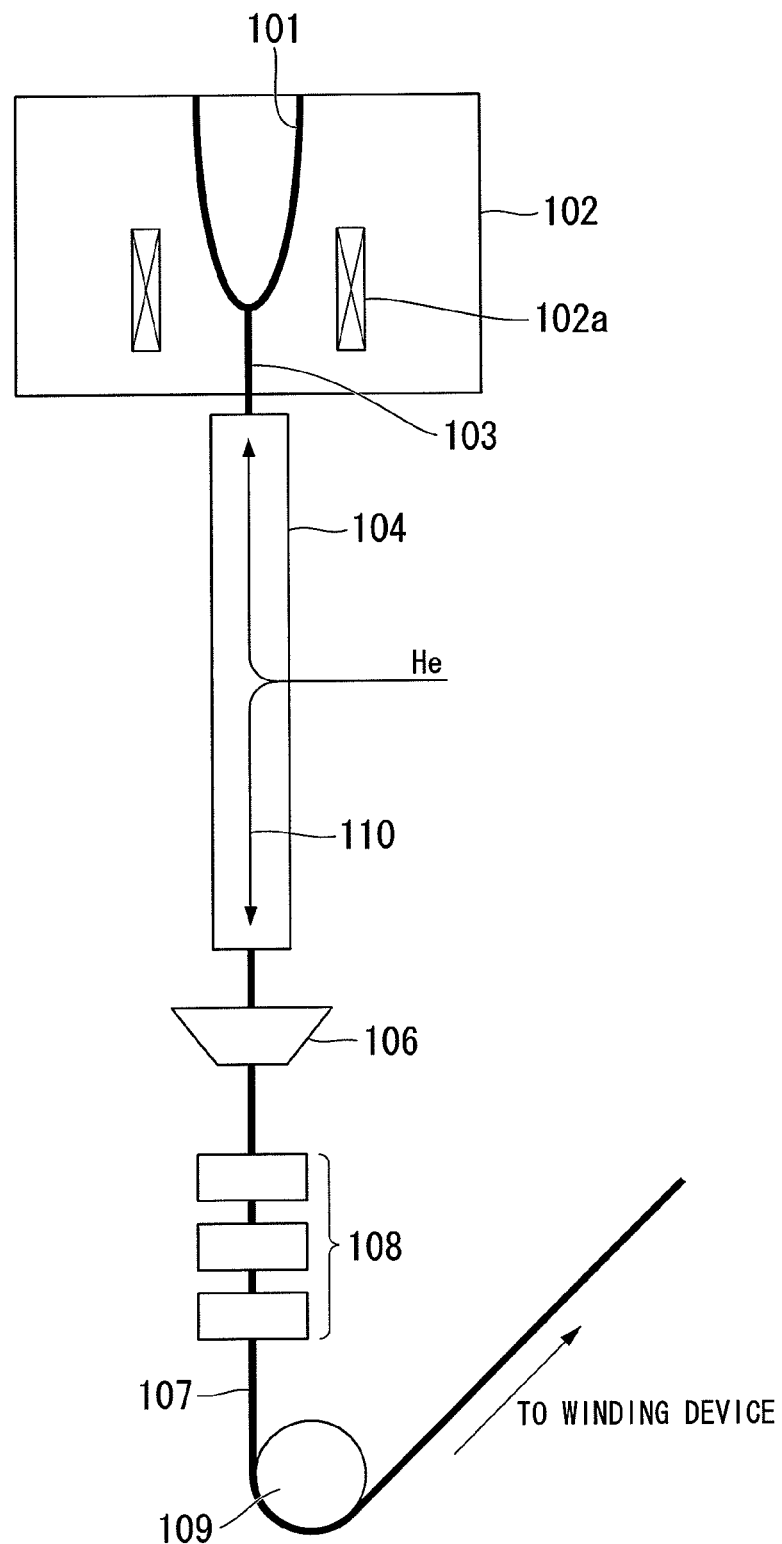
FIG. 14 is a schematic diagram illustrating a configuration of a typical optical fiber manufacturing method.

In the apparatus configuration shown in FIG. 14, the optical fiber is drawn at a center drawing velocity of 1800 (m/min) to manufacture the optical fiber.

The cooling device which is not connected with the heating furnace is not connected with the coating device by the connection component, and piping is configured so that mixture gas of the helium gas and the nitrogen gas flows into the lower portion of the cooling device.

As the cooling device, six cylindrical cooling tubes having an inner diameter of 10 mm and a length of 1 m which are made of brass and are connected with each other are used, and the cooling length of the cooling device is set to 6 m. Further, the temperature of the cooling water which circulates in the inside of the circulating water tube which form the cooling device is constantly set to 20° C.

Further, the total flow rate of the mixture gas of the helium gas and the nitrogen gas flowing into the lower portion of the cooling device is maintained at a constant value, and the flow rate of the mixture gas is controlled at a constant value by the drawing velocity signal.

While the drawing velocity is gradually increased at the start time of the fiber drawing, if the drawing velocity exceeds 800 (m/min), the coating diameter of the manufactured optical fiber becomes thin. Further, since the coating diameter becomes 180 μm or lower at the drawing velocity of 1000 (m/min), the fiber drawing of the optical fiber is stopped.

It is considered that this is because the upward stream of gas is almost not generated in the cooling device as the gas flowing into the cooling device is drawn to the optical fiber and thus the bare optical fiber cannot be cooled.

In the third comparative example, the flow rate of the helium gas is 0 (SLM), the flow rate of the nitrogen gas is 2.0 (SLM), and then the fiber drawing is started.

Fourth Comparative Example

In a fourth comparative example, the optical fiber is manufactured in a similar way to the third comparative embodiment except that the flow rate of the nitrogen gas is 20 (SLM).

While the drawing velocity is gradually increased at the start time of the fiber drawing, if the drawing velocity exceeds 1000 (m/min), the coating diameter of the manufactured optical fiber becomes thin. Further, since the coating diameter becomes 180 μm or lower at the drawing velocity of 1200 (m/min), the fiber drawing of the optical fiber is stopped.

It is considered that this is because the upward stream of gas is almost not generated in the cooling device as the gas flowing into the cooling device is drawn to the bare optical fiber and thus the bare optical fiber cannot be cooled.

The results of the third and fourth comparative examples will be described.

In the third and fourth comparative examples, the cooling device is not connected with the coating device by the connection component, the total flow rate of the helium gas and the nitrogen gas is maintained at a constant value, and then the mixture gas thereof flows in the cooling device to thereby perform the evaluation.

In the third and fourth comparative examples, although the total amount of the flow rate of the mixture gas is changed, as the drawing velocity is increased, the coating diameter becomes thin. It is considered that this is because the bare optical fiber cannot be cooled since the flow of the mixture gas in the cooling device is changed according to the increase in the drawing velocity. That is, in a case where the drawing velocity is slow, the flow of the mixture gas in the cooling device becomes the upward stream, but as the drawing velocity is increased, the amount of the mixture gas drawn to the bare optical fiber is increased. As a result, the flow of the mixture gas becomes the downward stream. Thus, it is considered that outside gas flows into the cooling device and the bare optical fiber cannot be cooled. Further, in the conditions of the third and fourth comparative examples, the flow of the gas is changed according to the drawing velocity, regardless of the amount of the gas in the cooling device. Thus, it can be understood that the conditions of the third and fourth comparative examples are not suitable for stable fiber drawing of the optical fiber or maintenance of the cooling capacity of the cooling device. In particular, it can be understood that they are not suitable for a high speed fiber drawing.

Fifth Comparative Example

In a fifth comparative example, the optical fiber is manufactured in a similar way to the third comparative example, except that piping is configured so that the helium gas flows into a lower portion of the first tube from the top of the cooling device and the nitrogen gas flows into an upper portion of the second tube from the top of the cooling device, and that the flow rate of the nitrogen gas flowing into the upper portion of the second tube from the top of the cooling device is feedback controlled by the coating diameter signal.

While the drawing velocity is gradually increased at the start time of the fiber drawing, if the drawing velocity exceeds 900 (m/min), the coating diameter of the manufactured optical fiber becomes thin. Further, since the coating diameter becomes 180 μm or lower at the drawing velocity of 1100 (m/min), the fiber drawing of the optical fiber is stopped.

The drawing velocity and the gas flow rate at the time of the fiber drawing are as follows, and the flow rate of the helium gas is maintained at a constant value.

The minimum drawing velocity $V_{min}$ is 800 (m/min), and at this time, the flow rate of the helium gas is 2.0 (SLM), and the flow rate of the nitrogen gas is 0.1 (SLM).

The normal fiber drawing velocity $V_{center}$ is 1800 (m/min), and at this time, the flow rate of the helium gas is 2.0 (SLM).

The maximum drawing velocity $V_{max}$ is 2000 (m/min), and at this time, the flow rate of the helium gas is 2.0 (SLM).

Sixth Comparative Example

In a sixth comparative example, the optical fiber is manufactured in a similar way to the fifth comparative example, except that the flow rate of the helium gas is maintained as a constant 20 (SLM).

The drawing velocity when the fiber drawing is started is adjusted to 800 (m/min), and then a good quality optical fiber starts to be manufactured as a product.

Thereafter, the manufacturing center drawing velocity is automatically increased to 1800 (m/min) for one hour. In this state, 1300 km of the optical fiber is drawn while maintaining the drawing velocity fluctuation range to ±200 (m/min). Then, after the drawing velocity is automatically decreased to 800 (m/min) for one hour, the fiber drawing of the optical fiber is ended. The good quality portion of the optical fiber is 800 km in total.

Around the drawing velocity of 2000 (m/min), the coating diameter the optical fiber manufactured due to insufficient cooling becomes thin. Further, at the drawing velocity of 800 (m/min), the total amount of the gas flow rates inside the cooling device is large, and thus, fiber vibration is generated in the bare optical fiber, and the coating diameter of the optical fiber fluctuates.

Further, the length as a faulty portion of the optical fiber used for the fiber drawing start is approximately 15 km, which is very short.

The drawing velocity and the gas flow rate at the time of the fiber drawing are as follows, and the flow rate of the helium gas is maintained constant.

The minimum drawing velocity $V_{min}$ is 800 (m/min), and at this time, the flow rate of the helium gas is 20 (SLM), and the flow rate of the nitrogen gas is 10 (SLM).

The normal fiber drawing velocity $V_{center}$ is 1800 (m/min), and at this time, the flow rate of the helium gas is 20 (SLM), and the flow rate of the nitrogen gas is 1.5 (SLM).

The maximum drawing velocity $V_{max}$ is 2000 (m/min), and at this time, the flow rate of the helium gas is 20 (SLM), and the flow rate of the nitrogen gas is 0 (SLM).

Figure 13:
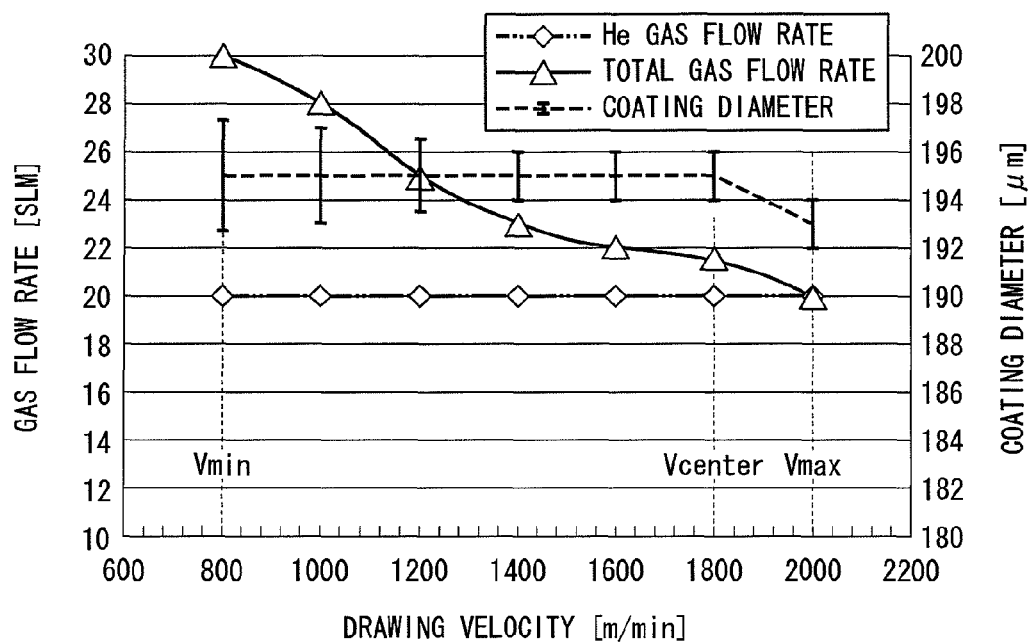
FIG. 13 is a graph illustrating the relationship between the drawing velocity, the flow rate of gas and the coating diameter in a sixth comparative example.

The relationship of the drawing velocity, the gas flow rate and the coating diameter is shown in FIG. 13.

The results of the fifth and sixth comparative examples will be described.

In the fifth and sixth comparative examples, the cooling device is not connected with the coating device by the connection component, piping is configured so that the helium gas flows into the lower portion of the first tube from the top of the cooling device and the nitrogen gas flows into the upper portion of the second tube from the top of the cooling device, the helium gas and the nitrogen gas are separated and then flow into the cooling device, to thereby perform the evaluation. Further, the evaluation is performed in a case where the flow rate of the helium gas is 2 (SLM) and 20 (SLM).

In the fifth comparative example, since the flow rate of the helium gas is low, if the drawing velocity becomes 900 (m/min) or higher, the coating diameter of the manufactured optical fiber starts to become thin. It is considered that this is because outside gas flows into the cooling device since the flow rate of the helium gas is low and thus the bare optical fiber cannot be cooled, and the drawing velocity is increased.

On the other hand, in the sixth comparative example, the cooling capacity of the cooling device is not sufficient regardless of the flow rate of the helium gas of 20 (SLM), and thus, the coating diameter of the manufactured optical fiber becomes thin. It is considered that this is because even though the flow rate of the helium gas is 20 (SLM), a lot of outside gas flows into the cooling device and the density of the helium gas in the cooling device is lowered. Further, in order to maintain the coating diameter of the manufactured optical fiber around the drawing velocity of 800 (m/min), the flow rate of the nitrogen gas of 10 (SLM) is required. For this reason, the total amount of the gas flow rate in the cooling device is 30 (SLM), and the Reynolds number is increased in the cooling device. As a result, it is considered that fiber vibration occurs in the bare optical fiber and the coating diameter of the manufactured optical fiber fluctuates.

The results of the first to fourth examples and the first to sixth comparative examples will be described.

If the cooling device is not connected with the coating device, the amount of the gas drawn to the bare optical fiber is increased as the drawing velocity is increased, and thus, the gas flow in the cooling device becomes the downward stream. Thus, outside gas flows into the cooling device, and thus, the bare optical fiber cannot be sufficiently cooled.

Further, even though the cooling device is connected to the coating device, in a case where the total amount of the gas flow rate flowing into the cooling device is controlled at a constant value, or in a case where the control is performed so that the flow rate one gas flowing into the cooling device is fixed and the flow rate of the other gas is variable, these gases are mixed into the protective cover layer to generate bubbles. Further, if the flow rate of the gas is changed in order to correspond to the wide drawing velocity, fiber vibration occurs in the bare optical fiber as the flow rate of the gas is significantly increased. As a result, it is difficult to maintain the coating diameter of the manufactured optical fiber at a constant value.

On the other hand, the manufacturing method using two control lines including the linear control using the drawing velocity signal and the feedback control using the coating diameter signal is an excellent method in which the coating diameter of the manufactured optical fiber becomes constant since fiber vibration of the bare optical fiber does not occur without significantly increasing the total amount of the gas flow rates.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

According to the optical fiber manufacturing method of the present invention, since the cooling device and the coating device are connected and a gas discharge port is located only in the upper portion of the cooling device, it is possible to efficiently prevent outside gas from being introduced into the cooling device, and to increase the density of the helium gas inside the cooling device. As a result, it is possible to significantly reduce the flow rate of helium to 5 to 50% of that of the conventional technique. Further, since the outside gas can be efficiently prevented from being introduced into the cooling device, it is possible to maintain the gas flow inside the cooling device as a stable upward stream.

Further, as the carbon dioxide gas flows in the upper portion of the coating device and the helium gas flows in the lower portion of the cooling device, the upward stream is generated inside the cooling device, and the carbon dioxide gas is sufficiently present near the coating resin. Thus, it is possible to prevent bubbles from being mixed into the protective cover layer.

Furthermore, since only the helium gas and the carbon dioxide gas are used, it is possible to maintain, by adjusting the flow rates of these gases, the responsiveness of the cooling capacity of the cooling device according to change in the flow rates, at a high level in a drawing velocity range in which the optical fiber is stably manufactured as a good quality portion.

The invention claimed is:

1. An optical fiber manufacturing method, comprising:
melting and deforming an optical fiber preform;
drawing a melted and deformed portion from the optical fiber preform as a bare optical fiber;
forcibly cooling the bare optical fiber in a cooling device;
forming a protective cover layer on the cooled bare optical fiber in a coating device; and
curing the protective cover layer,
the method further comprising:
connecting the cooling device and the coating device in an airtight manner and by preventing a cooling gas, flowing inside the cooling device, from flowing into the coating device by a meniscus of resin inside of the coating device, discharging a flow of the cooling gas inside the cooling device to an outside of an upper end of the cooling device as an upward stream;
allowing helium gas as the cooling gas to flow into a lower portion of the cooling device and allowing carbon dioxide gas as the cooling gas which is separated from the helium gas to flow into a side lower than a position where the helium gas flows in, during the forcible cooling; and
individually controlling a flow rate of the helium gas and a flow rate of the carbon dioxide gas by using both a signal indicating a coating diameter of the optical fiber and a signal indicating a drawing velocity of the optical fiber.

2. The optical fiber manufacturing method according to claim 1, further comprising controlling the flow rate of the helium gas using a signal indicating a drawing velocity of the optical fiber; and
feedback controlling the flow rate of the carbon dioxide gas using a signal indicating a coating diameter of the optical fiber.

3. The optical fiber manufacturing method according to claim 1, further comprising:
controlling the flow rate of the carbon dioxide gas using a signal indicating a drawing velocity of the optical fiber; and
feedback controlling the flow rate of the helium gas using a signal indicating a coating diameter of the optical fiber.

4. The optical fiber manufacturing method according to claim 1, the method further comprising:
adjusting the flow rate of the helium gas (X) according to the drawing velocity (V) of the optical fiber to satisfy either formulas (1) or (2) during the drawing and coating of the optical fiber, $$X = \frac{X_1 - X_2}{V_{max} - V_{center}} V + \frac{V_{max} X_2 - V_{center} X_1}{V_{max} - V_{center}} \quad (V_{center} \leq V \leq V_{max}) \quad (1)$$

$$X = \frac{X_2 - X_3}{V_{center} - V_{min}} V + \frac{V_{center} X_3 - V_{min} X_2}{V_{center} - V_{min}} \quad (V_{min} \le V \le V_{center}) \qquad (2)$$

where:
- the flow rate of the helium gas at the maximum drawing velocity $V_{max}$ (m/min) of the optical fiber is $X_1$ (Standard Liters per minute; SLM);
- the flow rate of the first helium gas at a normal fiber drawing velocity $V_{center}$ (m/min) of the optical fiber is $X_2$ (SLM);
- the flow rate of the helium gas at the minimum drawing velocity $V_{min}$ (m/min) of the optical fiber is $X_3$ (SLM);
- the drawing velocity of the optical fiber is V (m/min); and
- the flow rate of the helium gas is X (SLM).

5. The optical fiber manufacturing method according to claim 1, further comprising:
- allowing helium gas, carbon dioxide gas or nitrogen gas to flow into an upper portion of the cooling device; and
- individually controlling the flow rate of each gas.

6. The optical fiber manufacturing method according to claim 5,
wherein in a case where a first minimum drawing velocity of the optical fiber is $V_{min}$ (m/min), a second minimum drawing velocity of the optical fiber is $V_{min2}$ (m/min), a first maximum drawing velocity of the optical fiber is $V_{max}$ (m/min), a second maximum drawing velocity of the optical fiber is $V_{max2}$ (m/min), a normal fiber drawing velocity of the optical fiber is $V_{center}$, a relationship of the drawing velocities of the optical fiber is $V_{min2} < V_{min} < V_{center} < V_{max} < V_{max2}$, and the drawing velocity V of the optical fiber is changed to $V_{min2}$, $V_{min}$, $V_{center}$, $V_{max}$ and $V_{max2}$, in that order, a carbon dioxide gas or a nitrogen gas flowed into the upper portion of the cooling device is independently feedback controlled using a signal indicating a coating diameter of the optical fiber in the range of $V_{min2} < V < V_{min}$, and a helium gas flowed into the upper portion of the cooling device is independently controlled using a signal indicating the drawing velocity of the optical fiber in the range of $V_{max} < V < V_{max2}$.

7. The optical fiber manufacturing method according to claim 1, the method further comprising:
- allowing a second carbon dioxide gas as the cooling gas to flow into an upper portion of the cooling device and allowing a second helium gas as the cooling gas to flow into a side higher than a position where the second carbon dioxide flows in, during the forcible cooling.

* * * * *